United States Patent
Sugiura et al.

(10) Patent No.: US 12,266,758 B2
(45) Date of Patent: Apr. 1, 2025

(54) POLYMER ELECTROLYTE FOR A SOLID STATE BATTERY

(71) Applicants: TOYOTA MOTOR ENGINEERING & MANUFACTURING NORTH AMERICA, INC., Plano, TX (US); TOYOTA JIDOSHA KABUSHIKI KAISHA, Toyota (JP)

(72) Inventors: Ryuta Sugiura, Ann Arbor, MI (US); Mikhail Redko, Ann Arbor, MI (US); Michael Jones, Orchard Lake, MI (US); John G. Muldoon, Saline, MI (US); Patrick J. Bonnick, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/058,418

(22) Filed: Nov. 23, 2022

(65) Prior Publication Data

US 2024/0186564 A1    Jun. 6, 2024

(51) Int. Cl.
*H01M 10/056* (2010.01)
*H01M 4/38* (2006.01)
(Continued)

(52) U.S. Cl.
CPC ........... *H01M 10/056* (2013.01); *H01M 4/38* (2013.01); *H01M 4/505* (2013.01); *H01M 4/525* (2013.01);
(Continued)

(58) Field of Classification Search
CPC ...... H01M 10/056; H01M 4/38; H01M 6/181; H01M 10/0525
(Continued)

(56) References Cited

U.S. PATENT DOCUMENTS

| | | | |
|---|---|---|---|
| 4,956,444 A | * | 9/1990 | Kang ............... C08G 61/123 528/405 |
| 8,852,815 B2 | | 10/2014 | Kwon et al. |

(Continued)

FOREIGN PATENT DOCUMENTS

| | | | | |
|---|---|---|---|---|
| DE | 102019206131 A1 | * | 10/2020 | ........ H01M 10/0525 |
| KR | 20220119604 A | * | 8/2022 | ......... C08G 75/0204 |

(Continued)

OTHER PUBLICATIONS

Hosseinioun et al., Improved Lithium Ion Dynamics in Crosslinked PMMA Gel Polymer Electrolyte, Sep. 2, 2019, RSC Advances, vol. 9, p. 27574 (Year: 2019).*

(Continued)

*Primary Examiner* — Jonathan G Leong
*Assistant Examiner* — John S Medley
(74) *Attorney, Agent, or Firm* — Oblon, McClelland, Maier & Neustadt, L.L.P.

(57) ABSTRACT

Provided is a composition containing a redox charge-transfer complex of an electron donor polymer and an electron acceptor compound where the anionic form of the electron acceptor has a reduction potential higher than the reduction potential of the electron donor polymer; at least one metal salt and at least one additive compound having a dielectric constant of 10 or greater. The composition is a free-flowing, substantially amorphous powder and is useful as a metal ion conducting component of electrolytic cells.

20 Claims, 22 Drawing Sheets

(51) Int. Cl.
*H01M 4/505* (2010.01)
*H01M 4/525* (2010.01)
*H01M 4/62* (2006.01)
*H01M 10/0525* (2010.01)
*H01M 4/02* (2006.01)

(52) U.S. Cl.
CPC ....... *H01M 4/625* (2013.01); *H01M 10/0525* (2013.01); *H01M 2004/028* (2013.01); *H01M 2300/0082* (2013.01); *H01M 2300/0085* (2013.01)

(58) Field of Classification Search
USPC .......................................... 429/322
See application file for complete search history.

(56) References Cited

U.S. PATENT DOCUMENTS

| | | |
|---|---|---|
| 9,819,053 B1 | 11/2017 | Zimmerman |
| 2016/0049690 A1* | 2/2016 | Basak ............... C25B 13/08 252/62.2 |
| 2017/0005356 A1 | 1/2017 | Zimmerman |
| 2018/0151914 A1* | 5/2018 | Zimmerman ......... H01M 4/525 |
| 2019/0393553 A1* | 12/2019 | Tokuda ................ H01M 4/587 |
| 2020/0280091 A1* | 9/2020 | Christensen ........... H01M 4/62 |
| 2021/0066754 A1* | 3/2021 | Kim ..................... C07C 317/04 |
| 2022/0209290 A1* | 6/2022 | Takeuchi .......... H01M 10/0562 |
| 2023/0099184 A1* | 3/2023 | Deng .................... H01G 11/84 429/314 |

FOREIGN PATENT DOCUMENTS

| | | | | |
|---|---|---|---|---|
| WO | WO-2015159824 A1 * | 10/2015 | .......... | H01M 10/052 |
| WO | WO-2021003184 A2 * | 1/2021 | ........ | H01M 10/0525 |
| WO | WO-2022070874 A1 * | 4/2022 | ............... | H01B 1/06 |

OTHER PUBLICATIONS

Liu et al., A Review of Carbon-Based Materials for Safe Lithium Metal Anodes, Nov. 4, 2019, Frontiers in Chemistry, vol. 7, Abstract and pp. 4 and 6 (Year: 2019).*

Qingwen Lu, et al., "A Novel Solid Composite Polymer Electrolyte Based on Poly(ethylene oxide) Segmented Polysulfone Copolymers for Rechargeable Lithium Batteries," *Journal of Membrane Science*, 425-426, (2013) 105-112.

* cited by examiner

POLYMER ELECTROLYTE FOR A SOLID STATE BATTERY

FIELD OF THE DISCLOSURE

This disclosure is directed to novel compositions of solid polymer electrolytes useful in applications where a solid material having high ion conductivity, low electrical conductivity and stability to oxidation-reduction processes is required. Such utilities include but may not be limited to solid state electrolytes for a solid state battery and electrolyte components for electrode active material compositions.

BACKGROUND

Lithium-ion batteries have become an integral component of today's technology, providing a power source for a wide range of devices including computers, communication equipment and transportation vehicles. Development of electric vehicles having a travel range and power performance equivalent to or greater than present hydrocarbon fuel vehicles is an ongoing pursuit of research throughout the world.

Many conventional lithium ion (Li-ion) cells utilize carbonate solvent electrolytes which typically provide an energy density of from 150 to 265 Wh/kg. However, particularly for electric vehicle utility there is an ongoing demand to increase the energy density achievable in order to significantly extend the travel range per charge available to the vehicle.

Carbonate solvent electrolytes are highly flammable, which limits the maximum operating temperatures of carbonate electrolyte Li-ion cells to less than about 130° C. to prevent "thermal runaway" from uncontrolled exothermic reactions between the electrolyte and electrodes. Thus, battery packs of carbonate electrolyte cells require thermal management systems to prevent thermal runaway; however, such systems add weight and volume to the battery packs which ultimately reduces the pack-level energy density. Accordingly, any electrolyte that is thermally stable to temperatures higher than about 130° C. may facilitate simplification by reduction or omission of the thermal system requirement, thereby improving the pack-level energy density.

Solid electrolytes not based upon flammable solvents are an attractive alternative to conventional solvent based electrolytes. A persistent challenge requirement when formulating new electrolytes is to support Li-ion conductivities greater than about 1 ms/cm at 25° C. Development progress in solid electrolytes has shown that suitable lithium ion conductivities may be achievable and thus research in solid electrolyte development is ongoing. Solid electrolytes are generally classified as either inorganic or organic (polymeric). Solid-polymer electrolytes are an attractive alternative to inorganic solid electrolytes due to potentially lower manufacturing costs and greater ease to integrate into existing cell manufacturing processes. Moreover, polymer electrolytes have lower Young's moduli than inorganic electrolytes and are more likely to accommodate expansion and contraction of electrode active materials. Further, in contrast to sulfide-based inorganic solid electrolytes, solid polymer electrolytes may have greater air stability and do not evolve toxic hydrogen sulfide gas when in contact with moisture.

Poly(ethylene oxide) (PEO) has been extensively studied as a dry polymer electrolyte. PEO has been shown to support an ionic conductivity of about 0.001 mS/cm at room temperature with a transference number (fraction of the ionic current carried by Li-ion) of about 0.2 and an electrochemical stability window of about 0 to 3.8 V vs Li/Li$^+$. At room temperature (25° C.) PEO contains both amorphous and crystalline domains. Although both domains conduct Li$^+$, the amorphous domains support faster conductivity than the crystalline domains. Li$^+$ diffuses through the structure primarily via chain segmental motion which becomes much faster above the glass transition temperature ($T_g$). Therefore, cells using PEO electrolytes operate notably better at temperatures of about 80° C. where Li-ion conductivity is increased. This high temperature requirement is a disadvantage of PEO-based batteries because maintaining the higher temperature is energy intensive. To enhance ionic conductivity of PEO electrolytes at room temperature, additives and lithium salts have been blended into the PEO matrix. Exemplary additives include carbonate solvents such as ethylene carbonate, dinitriles such as succinonitrile and ionic liquids such as 1-n-propyl-2,3-dimethylimidazolium tetrafluoroborate.

There remains a need to develop a solid polymer electrolyte that supports high ion conductivity at room temperature and displays stability against oxidation. Further, there is a need for a solid polymer electrolyte which is thermally stable and is obtained via facile and low cost manufacturing processes.

SUMMARY OF THE EMBODIMENTS

Accordingly, an object of this application is to provide a solid polymer electrolyte having high metal ion conductivity while being a poor electron conductor which is suitable as a solid state electrolyte for a metal ion battery and/or suitable as a protective coating layer for an electrode active material or a component of an active material layer of an electrode.

Another object of this application is to provide a solid polymer electrolyte having high Li-ion conductivity while being a poor electron conductor which is suitable as a solid state electrolyte for a lithium-ion battery and/or suitable as a protective coating layer for a Li-ion electrode active material or a component of an active material layer of a Li-ion electrode.

A further object of this application is to provide a solid state lithium ion battery and/or lithium metal battery containing a solid state Li ion electrolyte membrane.

An additional object of this application is to provide Li-ion electrodes containing the solid polymer electrolyte.

These and other objects are provided by the embodiments of the present application, the first embodiment of which includes a composition, comprising:

a redox charge-transfer complex of an electron donor polymer and an electron acceptor compound where the anionic form of the electron acceptor has a reduction potential higher than the reduction potential of the electron donor polymer; at least one salt selected from the group consisting of alkali metal salts, alkaline earth metal salts and aluminum salts; and at least one additive compound having a dielectric constant of 10 or greater; wherein an ionic conductivity of the composition at 25° C. is 0.30 mS/cm or greater, the composition is stable to oxidation at 4.2 V vs Li/Li$^+$, and the composition is substantially amorphous.

In an aspect of the first embodiment, the electron donor polymer comprises aromatic rings bridged with groups having electron donating heteroatoms selected from the group consisting of —O—, —S—, —Se—, —N(R)— and —P(R)—; wherein R is H, methyl or phenyl and in a further aspect, the aromatic rings comprise at least one selected from the group consisting of 1,4-phenylene rings, 2,6-naphthalenyl rings, 4,4'-biphenyl rings and halogenated derivatives of any thereof.

In an aspect of the first embodiment, the electron donor polymer is at least one selected from the group consisting of poly(phenylene oxide), poly(2,6-dimethyl-1,4-phenylene oxide), poly(phenylene sulfide), poly[thio(2,3,5,6-tetrafluoro-1,4-phenylene)], fluorinated poly(phenylene sulfide) and poly(phenylene imine).

In an aspect of the first embodiment, the electron acceptor compound comprises a benzoquinone structure, a benzenecarbonitrile structure, an aromatic dianhydride structure, a fullerene structure or a metallo-porphine structure and in a further aspect the electron acceptor compound is at least one selected from the group consisting of tetracyanoethylene, 7,7,8,8-tetracyanoquinodimethane, tetrafluoro-1,4-benzoquinone, tetrachloro-1,4-benzoquinone and tetrabromo-1,4-benzoquinone.

In an aspect of the first embodiment, the additive compound is at least one selected from the group consisting of thietane-1,1-dioxide, 2-methyl-thietane-1,1-dioxide, 3-methyl-thietane-1,1-dioxide, N,N,N',N'-tetramethylsulfamide; tetrahydro-2,6-dimethyl-2H-1,2,6-thiadiazine-1,1-dioxide; 2,5-dimethyl-1,2,5-thiadiazolidine-1,1-dioxide; N,N'-diethyl-N,N'-dimethylsulfamide; N,N,N',N'-tetraethylsulfamide; dimethyl sulfone; ethyl methyl sulfone; diethylsulfone; sulfolane; tetrahydro-2-methylthiophene-1,1-dioxide; 1,1'-sulfonyl-bis[2-methoxyethane], 1-methoxy-2-(methylsulfonyl)ethane, 1,4-oxathiane-4,4-dioxide, 1,3,2-dioxathiolane-2,2-dioxide, 1,2-oxathiolan-5-one-2,2-dioxide, 3,3',3'',3'''-(1,2-ethanediyldinitrilo)tetrakis[propanenitrile], 1-butyl-3methylimidazoliumbis(trifluoromethyl-sulfonyl)imide, (3aR)-tetrahydro-3H-pyrrolo[1,2-c][1,2,3]oxathiazole-1,1-dioxide, 1,2,3-oxathiazolidine-3-carboxylic acid1,1-dimethylethyl ester-2,2-dioxide, 3-methyl-3-isothiazolidinone-1,1-dioxide, tetronic acid, sarcosine-N-carboxyanhydride, 1,3,5-trioxane and propane sultone.

In an aspect of the first embodiment, a wt % of the redox charge transfer complex is from 25% to 80%, a wt % of the at least one metal salt is from 5% to 30%, and a content of the additive compound is from 10% to 70 wt %.

In an aspect of the first embodiment, at least one additive compound comprises a blend of two or more components.

In an aspect of the first embodiment, the composition further comprises a polymer different from the electron donor polymer of the charge transfer complex and in a further aspect, the polymer different from the electron donor polymer is selected from the group consisting of polyalkyl (meth)acrylates, crosslinked-polyalkyl(meth)acrylates, poly(vinylsulfones) and polyacrylonitriles.

In an aspect of the first embodiment, the composition is electrically insulating having an electrical conductivity of 3.0 nS/cm or less.

In an aspect of the first embodiment, the ionic conductivity of the composition is substantially not changed upon exposure to dry-room air for 16 hours.

In an aspect of the first embodiment, the composition is a free-flowing powder.

In a second embodiment, the present application provides a solid state lithium ion battery, comprising: an anode capable of insertion and extraction of $Li^+$ ions; a cathode capable of insertion and extraction of $Li^+$ ions; and a solid state electrolyte between the anode and cathode comprising the composition of the first embodiment including one or more of the aspects described above wherein at least one metal salt is a lithium salt.

In an aspect of the second embodiment, the anode comprises an active material selected from the group consisting of lithium, a lithium alloy, graphite, hard carbon, lithium titanate (LTO), a tin/cobalt alloy and a silicon/carbon composite.

In an aspect of the second embodiment, the cathode comprises an active material selected from the group consisting of lithium cobalt oxide ($LiCoO_2$), lithium manganese oxide ($LiMn_2O_4$), lithium iron phosphate ($LiFePO_4$), lithium nickel manganese cobalt oxide (NMC), elemental sulfur and a metal sulfide composite.

In a third embodiment, the present application provides an electrode for a lithium ion battery, comprising: an active material capable of insertion and extraction of $Li^+$ ions; a carbon conductive additive; the composition of the first embodiment including one or more of the aspects described above wherein at least one metal salt is a lithium salt; and a binder.

In an aspect of the third embodiment, a wt % of the active material is from 40 wt % to 98 wt %, and a wt % of the composition is from 5 wt % to 50 wt %.

In an aspect of the third embodiment, the electrode is a negative electrode, and the active material is at least one selected from the group consisting of lithium, a lithium alloy, graphite, hard carbon, lithium titanate (LTO), a tin/cobalt alloy and a silicon/carbon composite.

In an aspect of the third embodiment, the electrode is a positive electrode, and the active material is at least one selected from the group consisting of lithium cobalt oxide ($LiCoO_2$), lithium manganese oxide ($LiMn_2O_4$), lithium iron phosphate ($LiFePO_4$), lithium nickel manganese cobalt oxide (NMC), elemental sulfur and a metal sulfide composite.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DESCRIPTION OF THE PREFERRED EMBODIMENTS

Figure 1:
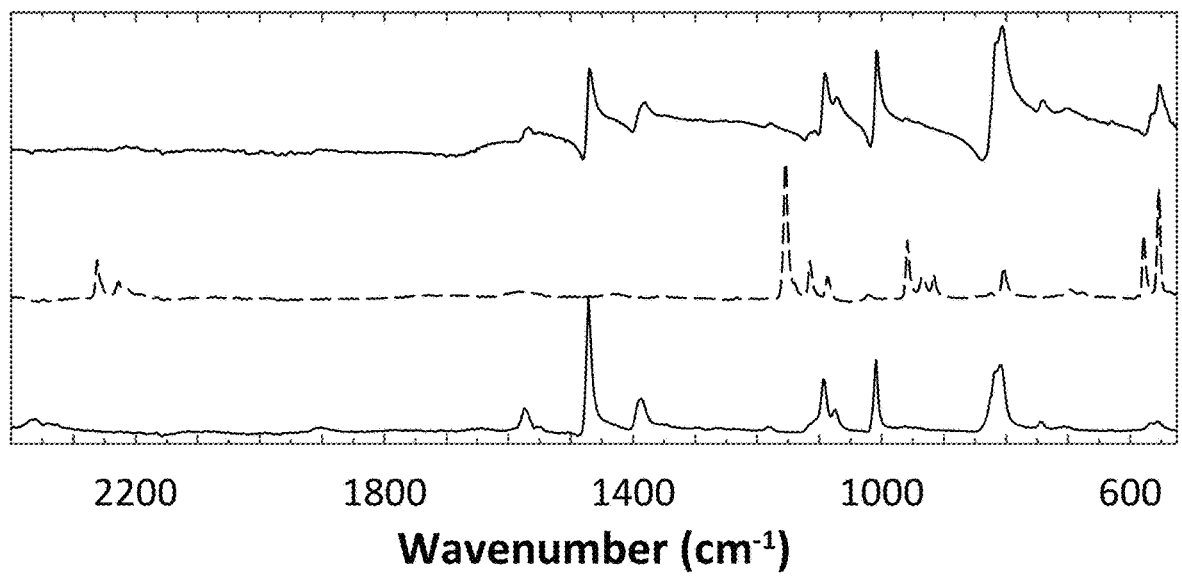
FIG. 1 shows the use of FTIR to determine formation of the charge transfer complex of poly(phenylene sulfide) (PPS) and tetracyanoethylene (TCNE).

The present disclosure provides a composition which is useful as a metal ion conducting component of electrolytic cells. In its final form the composition is a free-flowing powder which is stable to air and can be processed in conventional dry-room environments, thus not requiring inert gas processing facilities. The composition is substantially amorphous showing less than 5% crystallinity in an XRD analysis and while being essentially electrically insulating, an ionic conductivity at 25° C. may be 0.30 mS/cm or greater. Thus, the composition is capable to provide advantageous performance in utilities including but not restricted to solid separators for solid state metal ion batteries and electrolyte additives for electrodes which intercalate and de-intercalate metal ions.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where a numerical limit or range is stated, the endpoints are included. Also, all values and subranges within a numerical limit or range are specifically included as if explicitly written out.

The term free-flowing powder within the scope of this disclosure indicates that the powder particles do not stick together, i.e., are not cohesive with one another and the powder can be transferred by a pouring action.

It has been discovered that a composition containing a redox charge-transfer complex of an electron donor polymer and an electron acceptor compound where the anionic form of the electron acceptor has a reduction potential higher than the reduction potential of the electron donor polymer; at least one salt selected from alkali metal salts, alkaline earth metal salts, zinc salts and aluminum salts; and at least one additive compound having a dielectric constant of 10 or greater in selected wt % proportions as described herein has the properties as disclosed and therefore, may be employed in utilities where metal ion conductivity and no or low electrical conductivity are required.

The redox charge-transfer complex may be obtained by combining a polymer having structures susceptible to oxidation with an oxidizing compound capable of at least partially oxidizing the polymer, preferably capable of fully oxidizing the polymer. Throughout this description the terms redox charge-transfer complex, polymer charge-transfer complex and charge-transfer complex (CTC) may be used interchangeably unless the context of the description defines otherwise. Polymers that are susceptible to oxidation by many known oxidants and found capable to form the disclosed charge-transfer complex contain heteroatoms in conjugated interaction with aromatic rings. Polymers of this disclosure may contain aromatic rings selected from 1,4-phenylene rings, 2,6-naphthalenyl rings, 4,4'-biphenyl rings and halogenated derivatives of any thereof.

Although not wishing to be limited by theory, it is believed that when the oxidant and polymer interact, electron density is transferred into the aromatic ring π system and in a redox interaction electron density is transferred to the oxidant molecule to form the charge transfer complex. Thus, in the charge transfer complex the polymer may be described as the electron donor polymer and the oxidant described as the electron acceptor compound. Depending on the reduction potential of the oxidant and the structure of both the donor polymer and the oxidant from 0.1 to 2 electrons may be transferred to form the complex. To obtain such charge-transfer complex the reduction potential of the oxidant anion must be greater than the reduction potential of the polymer.

Although any heteroatom having nonbonding electrons capable of being delocalized into an aromatic ring system may be suitable, heteroatoms of Groups 15 and 16 of the periodic table may be most commonly employed. Preferred heteroatoms of polymeric structures include N, O, P, S and Se and polymers having one or more of the folowing structures may be preferred: —O—, —S—, —Se—, —N(R)— and —P(R)—, where R may be H, methyl or phenyl.

Although any polymer having a heteroatom with nonbonding electrons which may delocalize into an aromatic ring may serve as the electron donor polymer, Table 1 provides examples of potential electron donor polymers.

TABLE 1

Examples of polymers susceptible to an oxidation agent.

| Polymer | Structure |
| --- | --- |
| Poly(2,6-dimethyl-1,4-phenylene oxide) | |
| Poly(phenylene sulfide) | |
| Poly[thio(2,3,5,6-tetrafluoro-1,4-phenylene)] | |
| Poly[thio(2,3,5,6-tetrafluoro-1,4-phenylene)thio(2,3,5,6-tetrafluoro-1,4-phenylene)thio-1,4-phenylenethio-1,4-phenylene] | |
| Poly[thio(2,3,5,6-tetrafluoro-1,4-phenylene) thio-1,4-phenylenethio-1,4-phenylene] | |

TABLE 1-continued

Examples of polymers susceptible to an oxidation agent.

| Polymer | Structure |
| --- | --- |
| Poly[thio(2,3,5,6-tetrafluoro-1,4-phenylene)thio(2,3,5,6-tetrafluoro-1,4-phenylene)thio-1,4-phenylene(phenylphosphinylidene)-1,4-phenylene] | |
| Poly(phenylene imine) | |
| Poly(phenylene oxide) | |
| Poly(oxy-1,4-phenyleneoxy-1,4-phenylenesulfonyl-1,4-phenylene) | |
| Poly(oxy-1,4-phenyleneoxy-1,4-phenylenecarbonyl-1,4-phenylene) | |
| Poly(oxy-1,4-phenyleneoxy-1,4-phenyleneoxy-1,4-phenylenecarbonyl-1,4-phenylene) | |
| Poly(oxy-1,4-phenyleneoxy-1,4-phenyleneoxy-1,4-phenylenecarbonyl-1,4-phenylenecarbonyl-1,4-phenylene) | |
| Poly(oxy-1,4-phenyleneoxy-1,4-phenylenecarbonyl-1,4-phenyleneoxy-1,4-phenyleneoxy-1,4-phenylenecarbonyl-1,4-phenylene) | |

TABLE 1-continued

Examples of polymers susceptible to an oxidation agent.

| Polymer | Structure |
| --- | --- |
| Fluorinated poly(phenylene sulfide) | |
| Poly[thio-1,4-phenylenethio-1,4-phenylenethio(2,2',3,3',5,5',6,6'-octafluoro[1,1'-biphenyl]-4,4'-diyl)] | |
| Poly[oxy(2,3,5,6-tetrafluoro-1,4-phenylene)thio(2,3,5,6-tetrafluoro-1,4-phenylene)oxy-1,4-phenylene[2,2,2-trifluoro-1-(trifluoromethyl)ethylidene]-1,4-phenylene] | |
| Bisphenol A polysulfone | |
| Poly[oxy-1,4-phenylenecarbonyl-1,4-phenyleneoxy-1,4-phenylene(1-methylethylidene)-1,4-phenylene] | |

Preferred electron donor polymers may include poly(phenylene oxide), poly(2,6-dimethyl-1,4-phenylene oxide), poly(phenylene sulfide)(PPS), poly[thio(2,3,5,6-tetrafluoro-1,4-phenylene)], fluorinated poly(phenylene sulfide) and poly(phenylene imine).

As indicated above, any anion compound having a reduction potential greater than that of the electron donor polymer and capable to stabilize increased electron density may serve as the electron acceptor of the charge transfer complex. Suitable oxidant compounds may contain a benzoquinone structure, a benzenecarbonitrile structure, an aromatic dianhydride structure, a fullerene structure or a metallo-porphine structure.

Although not limited to these, compounds which may be suitable oxidants of this disclosure are listed in Table 2.

TABLE 2

Example oxidizing agents.

| Oxidizing Agent | Structure |
|---|---|
| Benzoquinone | |
| Tetrafluoro-1,4-benzoquinone | |
| Tetrachloro-1,4-benzoquinone | |
| Tetrabromo-1,4-benzoquinone | |
| 1,2,4,5-Benzenetetracarbonitrile | |
| 1,3,5-Benzenetricarbonitrile | |
| 1,3,5-Trinitrobenzene | |
| 1,2,3,4,5,6-Benzenehexacarbonitrile | |

TABLE 2-continued
Example oxidizing agents.
| Oxidizing Agent | Structure |
|---|---|
| Pyromellitic dianhydride | 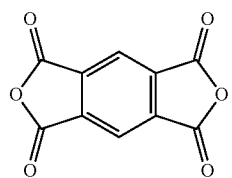 [SMILES: O=c1oc(=O)c2cc3c(=O)oc(=O)c3cc12] |
| Benzo[1,2-c:4,5-c']dipyrrole-1,3,5,7(2H,6H)-tetrone | 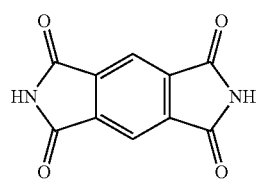 [SMILES: O=c1[nH]c(=O)c2cc3c(=O)[nH]c(=O)c3cc12] |
| Naphthalenetetracarboxylic dianhydride | 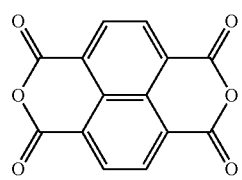 [SMILES: O=C1OC(=O)c2ccc3c4c(ccc1c24)C(=O)OC3=O] |
| Benzo[/mn][3,8]phenanthroline-1,3,6,8(2H,7H)-tetrone | 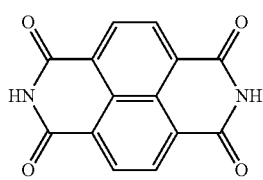 [SMILES: O=C1NC(=O)c2ccc3c4c(ccc1c24)C(=O)NC3=O] |
| Fullerene-$C_{60}$ | 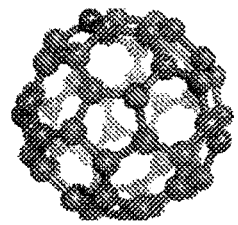 |
| Fullerene-$C_{70}$ | 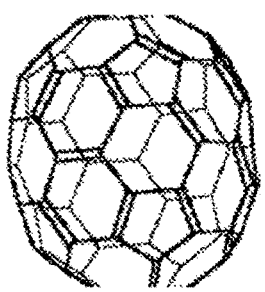 |

TABLE 2-continued

Example oxidizing agents.

| Oxidizing Agent | Structure |
|---|---|
| [5,10,15,20-tetrakis(2,3,4,5,6-pentafluorophenyl)-21H,23H-porphinato(2-)-κN$^{21}$, κN$^{22}$,κN$^{23}$, κN$^{24}$]-, (SP-4-1)-metal | |
| [1,2,3,4,8,9,10,11,15,16,17,18,22,23,24,25-hexadecafluoro-29H,31H-tetrabenzo[b,g,/,q]porphinato(2-)-κ/N$^{29}$, κN$^{30}$, κN$^{31}$, κN$^{32}$]., (SP-4-1)-metal | |

The charge-transfer complex may be obtained by mixing the polymer and oxidizer materials together and then heating the mixture to a temperature to promote charge transfer between the electron donor polymer and oxidant compound. In one embodiment upon mixing the polymer and oxidant the temperature is ramped upward at a rate of from 0.1° C./min to 2.0° C./min to the final temperature and the mixture is maintained at that temperature for from 30 minutes to 10 hours. Optionally, the mixture may be allowed to cool and then reheated to a selected elevated temperature. The temperature is ramped up slowly to give the oxidizer time to react with the polymer. In a preferred synthesis, one of the two components will be in a liquid or gaseous state, or become a liquid or gas during heating, to increase the contact area between polymer and oxidizing agent. Where volatile components are present conducting the heat treatment in a sealed container may be necessary to prevent gasses from escaping. Explicit examples of the synthesis of redox charge-transfer complexes are provided in the Examples of this disclosure.

Scheme 1 provides a formula conceptual image of the formation of the charge transfer complex of poly(phenylene sulfide) (PPS) and tetrafluoro-1,4-benzoquinone (TFBQ). When brought into contact at room temperature, PPS and TFBQ form a light violet powder, indicating the formation of a coordinated complex. However, when heated at elevated temperatures the powder turns brown.

Scheme 1

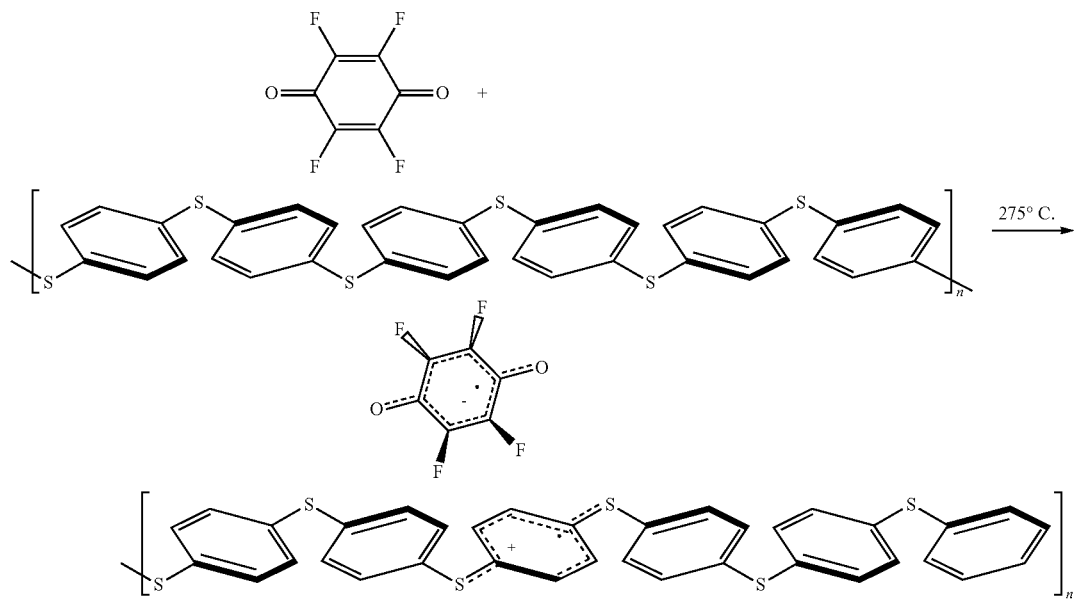

Figure 2:
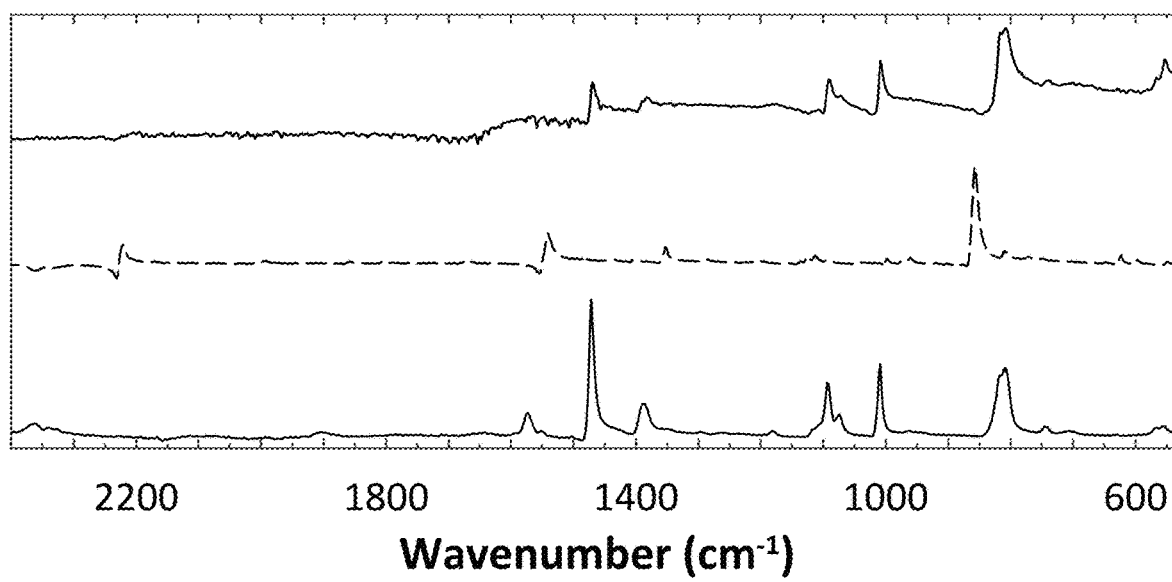
FIG. 2 shows the use of FTIR to determine formation of the charge transfer complex of poly(phenylene sulfide) (PPS) and 7,7,8,8-tetracyanoquinodimethane (TCNQ).
Figure 3:
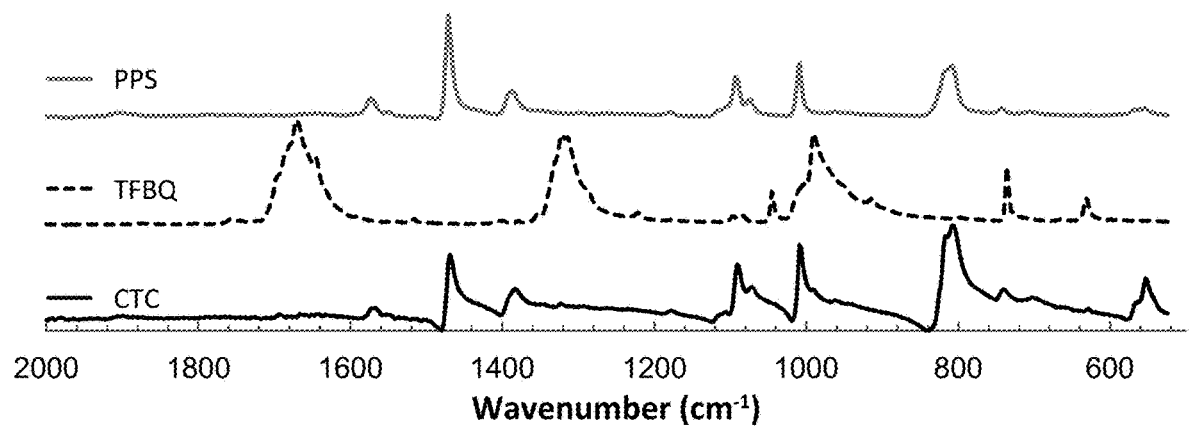
FIG. 3 shows the use of FTIR to determine formation of the charge transfer complex of poly(phenylene sulfide) (PPS) and tetrafluoro-1,4-benzoquinone (TFBQ).

Fourier Transform Infrared analysis may be performed to assess the formation of the charge transfer complex as shown in FIGS. 1-3 and described in the Examples. In FIG. 1, FIG. 2 and FIG. 3, the solid black lines are pure poly (phenylene sulfide) (PPS), the dashed lines are different oxidizing agents and the dotted lines are the resulting charge-transfer complexes. FIG. 1 contains the oxidizing agent tetracyanoethylene (TCNE, dashed line) and the resulting charge-transfer complex (dotted line). Similarly, FIG. 2 contains 7,7,8,8-tetracyanoquinodimethane (TCNQ), as the dashed line and tetrafluoro-1,4-benzoquinone (TFBQ) as the dotted line. In all three cases, the absence of oxidizing agent peaks (dashed lines) in the spectrum of the product charge-transfer complex (dotted line) indicates that no residual oxidizing agent remains following synthesis. Regardless of the oxidizing agent, the formation of the charge-transfer complex can be confirmed by the growth of the three peaks at 820, 1000 and 1090 cm$^{-1}$, relative to the peak at 1470 cm$^{-1}$, in progressing from pure PPS (solid black line) to the charge-transfer complex (dotted line). The spectrum of the charge-transfer complex does not show peaks attributed to the oxidant, signifying consumption of the oxidant and for example when poly(phenylene sulfide) (PPS) is the electron donor polymer the spectrum shows growth of peaks at about 820 cm$^{-1}$, 1000 cm$^{-1}$ and 1090 cm$^{-1}$ relative to a peak at about 1470 cm$^{-1}$ which is present in the spectrum of the PPS. Other methods to verify the formation of the charge transfer complex are described in the examples.

Figure 4:
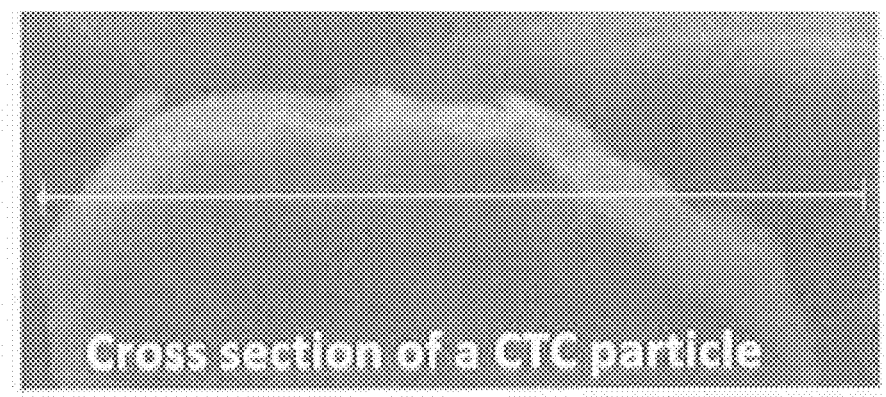
FIG. 4 shows a cross sectional scanning electron microscopy image of a CTC particle of tetrafluoro-1,4-benzoquinone (TFBQ) and PPS.
Figure 5:
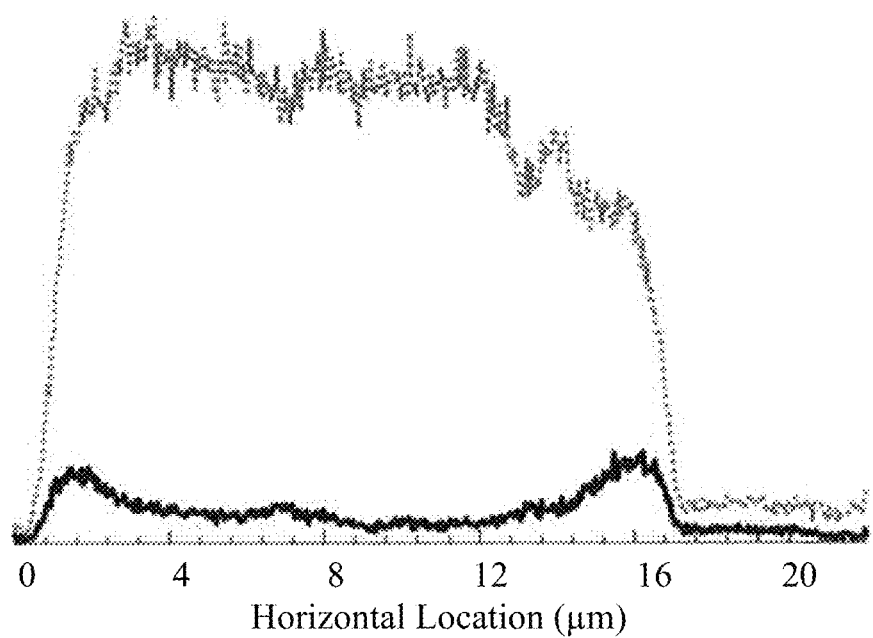
FIG. 5 shows the sulfur (upper curve) and fluorine (lower curve) content of the CTC particle across the line of the image of FIG. 4.

Cross-sectional energy X-ray spectroscopy of the charge transfer complex (CTC) particles shows that the charge transfer complex appears to form primarily on the surface of the electron donor polymer particles. For example, a cross sectional scanning electron microscopy image of a CTC particle of tetrafluoro-1,4-benzoquinone (TFBQ) and PPS is shown in FIGS. 4 and FIG. 5. FIG. 5 shows the sulfur (upper curve) and fluorine (lower curve) contents across the line of the image of FIG. 4. The location of the fluorine mainly at the edge of the CTC particles appears to indicate that the charge transfer complex forms on the surface of the PPS particle. However, this may also reflect that the TFBQ did not fully penetrate the PPS matrix.

The solid CTC material may be milled or crushed into small particles to be mixed with the metal salts and the additive compound having a dielectric constant of 10 or greater. The complete mixture may be prepared by ball milling the components until a homogeneous composition is obtained or by any powder mixing process known in the art.

The metal salt may be any of an alkali metal salt, alkaline earth metal salt, zinc salt and aluminum salt and may be a combination of metal salts. For example, to obtain a lithium ion conductive electrolyte any of lithium salts conventionally employed as lithium electrolyte in lithium ion batteries may be employed. Common electrolytes of this disclosure include but are not limited to LiF, LiCl, LiBr, lithium bis(trifluoromethanesulfonyl)imide (LiTFSI), lithium bis (perfluoroethylsulfonyl)-imide, lithium tetrafluoroborate (LiBF$_4$), lithium bis(oxalato)borate (LiBOB), lithium bis (fluorosulfonyl)imide (LiFSI) and lithium hexafluorphosphate (LiPF$_6$). Combinations of these may provide advantageous properties which may be determined by experimentation.

Figure 6:
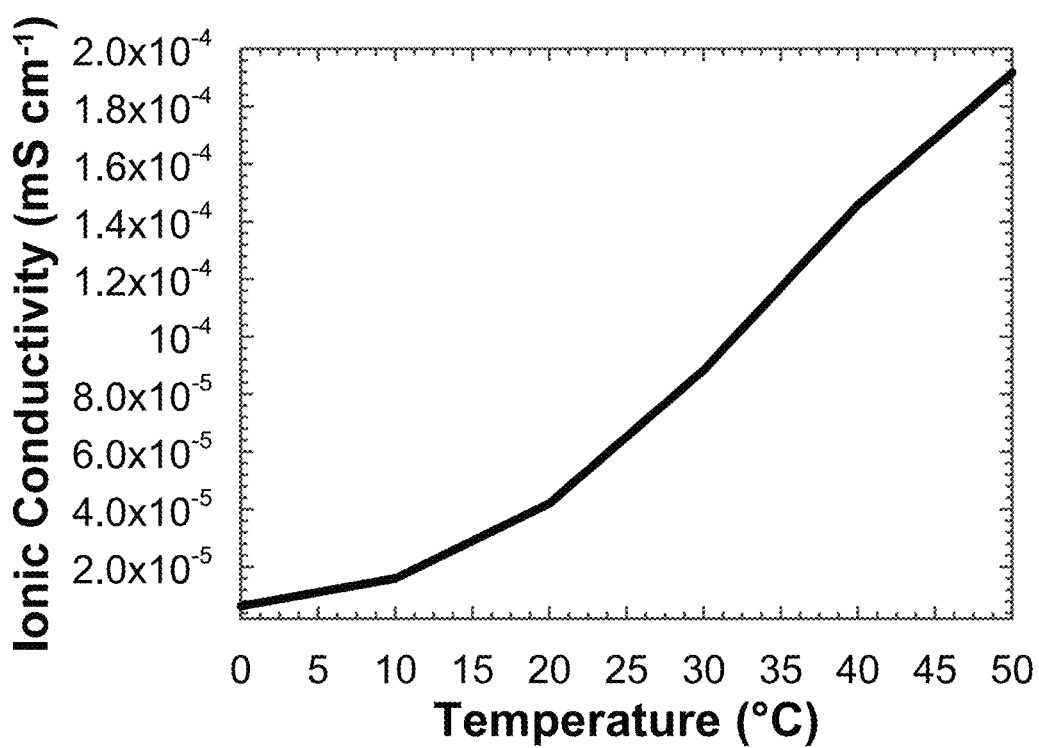
FIG. 6 shows the ionic conductivity of a CTC-lithium salt mixture.

It has been determined that a mixture of the CTC and metal salt is a poor ionic conductor. For example, FIG. 6 shows the ionic conductivity variation with temperature of a mixture of PPS-TFBQ charge transfer complex and a 5:5:1 molar mixture of LiTFSI:LiFSI:LiBOB which was pressed into a pellet between two stainless steel plates. Impedance spectroscopy was used to measure the ionic conductivity as shown in FIG. 6 and as indicated the ionic conductivity is low, supporting a conductivity of 6.5×10$^{-8}$ S/cm at 25° C.

Figure 7:
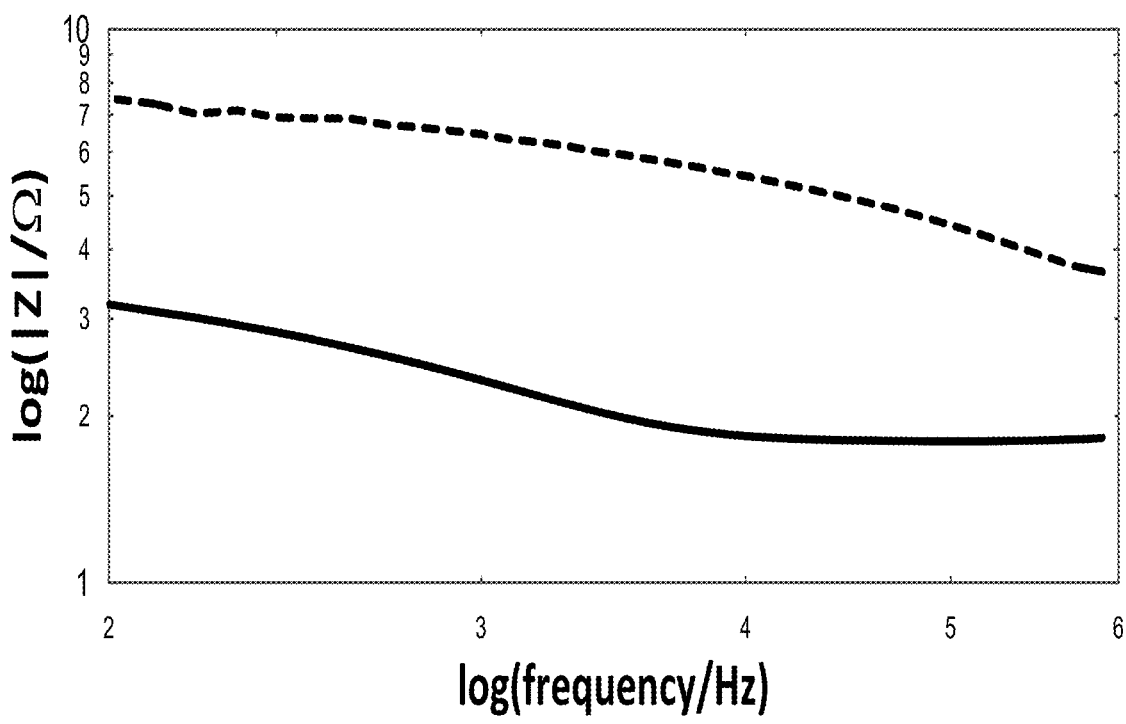
FIG. 7 shows the Bode impedance of of a mixture of PPS-TFBQ charge transfer complex and a 5:5:1 molar mixture of LiTFSI:LiFSI:LiBOB in comparison to a composition wherein thietane-1,1-dioxide (TT) was added.

However, it has been discovered that when an additive compound having a dielectric constant of 10 or greater is added to the mixture the impedance of the resulting composition is significantly reduced. FIG. 7 shows the Bode impedance of of a mixture of PPS-TFBQ charge transfer complex and a 5:5:1 molar mixture of LiTFSI:LiFSI:LiBOB (upper dashed curve) in comparison to a composition wherein thietane-1,1-dioxide (TT) (lower solid curve) was added. This decrease in impedance is significant and unexpected.

Therefore, in a first embodiment the present disclosure provides a composition, comprising:
  a redox charge-transfer complex of an electron donor polymer and an electron acceptor compound where the anionic form of the electron acceptor has a reduction potential higher than the reduction potential of the electron donor polymer;
  at least one salt selected from the group consisting of alkali metal salts, alkaline earth metal salts, zinc salts and aluminum salts; and
  at least one additive compound having a dielectric constant of 10 or greater. As described herein the composition of the first embodiment has an ionic conductivity at 25° C. of 0.30 mS/cm or greater. The composition is stable to oxidation at 4.2 V vs Li/Li$^+$, and the composition is substantially amorphous. According to this disclosure the description "substantially amorphous" describes that an X-ray diffraction scan of the composition indicates that the crystallinity of the original components is reduced to 5% or less.

Although not intending to be limiting, some exemplary additives having a dielectric constant of 10 or greater and suitable for the present disclosure are listed in Table 3.

TABLE 3

Example additives

| Additive | Structure |
|---|---|
| Thietane-1,1-dioxide | |
| 2-Methyl-thietane 1,1-dioxide | |
| 3-Methyl-thietane 1,1-dioxide | |
| N,N,N',N'-Tetramethylsulfamide | |
| Tetrahydro-2,6-dimethyl-2H-1,2,6-thiadiazine, 1,1-dioxide | |
| 2,5-dimethyl-, 1,2,5-thiadiazolidine 1,1-dioxide | |
| N,N'-Diethyl-N,N'-dimethylsulfamide | |
| N,N,N',N'-Tetraethylsulfamide | |
| Dimethyl sulfone | |
| Ethyl methyl sulfone | |
| Diethylsulfone | |
| Sulfolane | |

TABLE 3-continued

Example additives

| Additive | Structure |
| --- | --- |
| Tetrahydro-2-methylthiophene-1,1-dioxide | |
| 1,1'-Sulfonylbis[2-methoxyethane] | |
| 1-Methoxy-2-(methylsulfonyl)ethane | |
| 1,4-Oxathiane 4,4 dioxide | |
| 1,3,2-Dioxathiolane 2,2-dioxide | |
| 1,2-Oxathiolan-5-one 2,2-dioxide | |
| 3,3',3'',3'''-(1,2-Ethanediyldinitrilo) tetrakis[propanenitrile] | |
| 1-Butyl-3-methylimidazoliumbis(trifluoromethylsulfonyl)imide | |
| (3aR)-Tetrahydro-3H-pyrrolo[1,2-c][1,2,3]oxathiazole-1,1-dioxide | |
| 1,2,3-Oxathiazolidine-3-carboxylic acid 1,1-dimethylethyl ester 2,2-dioxide | |
| 2-methyl-3-isothiazolidinone 1,1-dioxide | |
| Tetronic acid | |
| Sarcosine N-carboxyanhydride | |

TABLE 3-continued

Example additives

| Additive | Structure |
|---|---|
| 1,3,5-Trioxane |  |
| Propane sultone | 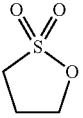 |

In selected compositions, combinations of two or more additives having a dielectric constant of 10 or greater may be useful to maximize the ionic conductivity of the composition. Combinations of additives are described below.

The composition may comprise, essentially consist of or consist of from 15 wt % to 80 wt % of the redox charge transfer complex (polymer charge-transfer complex), preferably from 20 wt % to 80 wt % and most preferably from 25 wt % to 80 wt %;
  from 5 wt % to 30 wt % of the at least one metal salt, preferably from 8 wt % to 25 wt % and most preferably from 10 wt % to 20 wt %; and
  from 10 wt % to 70 wt % of the additive compound having a dielectric constant of 10 or greater, preferably from 15 wt % to 60 wt % and most preferably from 20 wt % to 50 wt %.

Throughout this disclosure the terms "polymer electrolyte composition" and "composition of the disclosure" describe compositions containing the polymer charge-transfer complex, the metal salt and the additive having a dielectric constant of 10 or greater.

When combinations of several components such as the metal salt or the additive compound are employed the total content of the combination is within the limits described above.

In one aspect, the composition is lithium ion conductive and the metal salt is a lithium salt. Examples of the lithium salt may include but are not limited to LiF, LiCl, LiBr, lithium bis(trifluoromethanesulfonyl)imide (LiTFSI), lithium bis(perfluoroethylsulfonyl)-imide, lithium tetrafluoroborate (LiBF$_4$), lithium bis(oxalato)borate (LiBOB), lithium bis(fluorosulfonyl)imide (LiFSI) and lithium hexafluorphosphate (LiPF$_6$).

Figure 21:
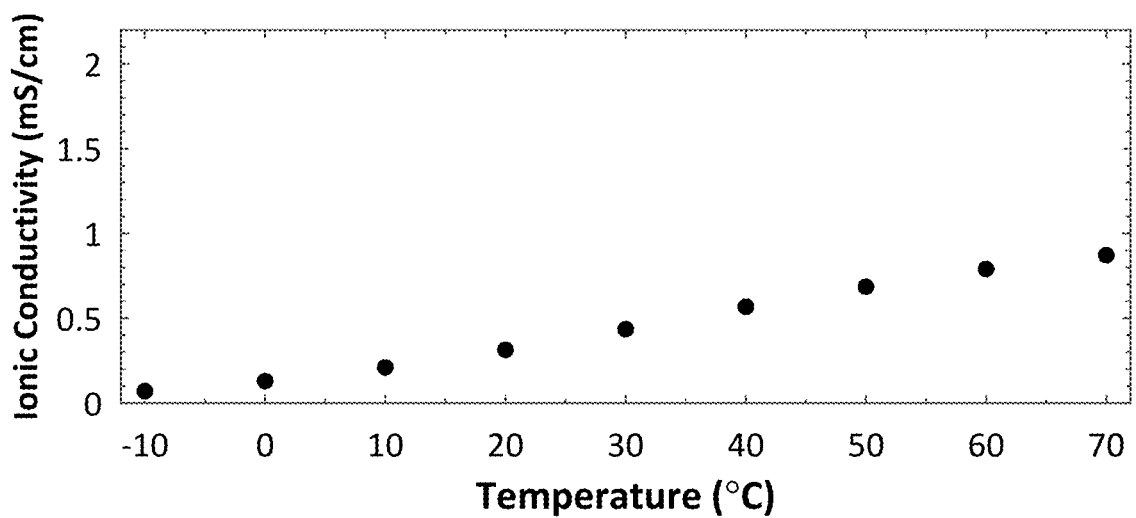
FIG. 21 shows the ionic conductivity of a polymer electrolyte containing PPS-TCNE charge-transfer complex (CTC) as a function of temperature.
Figure 22:
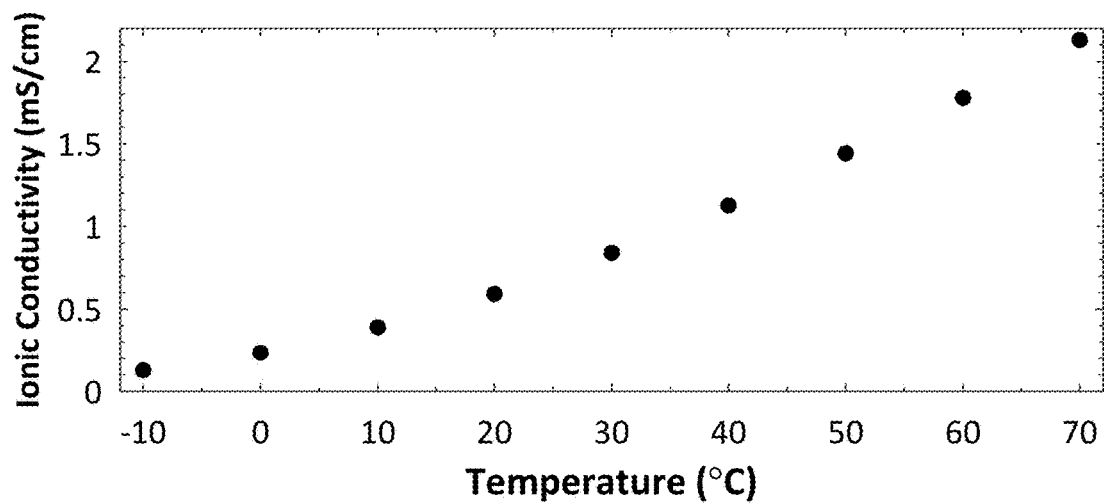
FIG. 22 shows the Ionic conductivity of a polymer electrolyte containing PPS-TFBQ charge-transfer complex (CTC) as a function of temperature.

Further, the selection of the polymer and oxidant combination to form the charge transfer complex (CTC) may be made on the basis of model compounds and/or based upon selection of combinations which provide a target ionic conductivity. For, example, the ionic conductivity of a polymer electrolyte composition containing a PPS-TCNE charge transfer complex is shown in FIG. 21 and the ionic conductivity of a polymer electrolyte composition containing a PPS-TFBQ charge transfer complex is shown in FIG. 22. At temperatures of approximately 30° C. and higher the ionic conductivity of the composition containing the PPS-TFBQ charge transfer complex is about twice that of the composition based on the PPS-TCNE charge transfer complex. Thus, within the wide range of potential electron donor polymers and oxidant compounds combinations selected on various target properties may be obtained.

Figure 23:
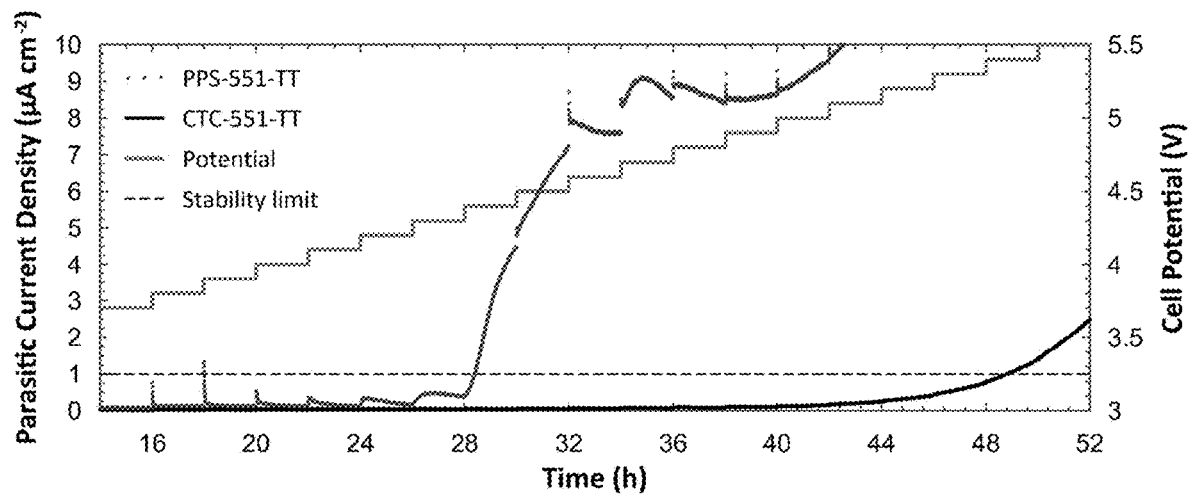
FIG. 23 shows the oxidative stability of compositions based on a charge-transfer complex (CTC) particles or poly(phenylene sulfide) (PPS) particles.

The free-flowing powder polymer electrolyte compositions described herein are stable to air and therefore, do not require inert environment handling facilities such as argon-filled glove boxes. Thus, the PPS-TFBQ polymer electrolyte composition characterized with the ionic conductivity of FIG. 22 was exposed to dry-room air for 16 hours. The ionic conductivity of the dry air exposed composition is shown in FIG. 23 and as indicated the conductivity is essentially equal to that of FIG. 22, within a range of experimental error.

To have a long cycle life, the electrolyte within a cell must be stable against decomposition at the positive electrode. The oxidative stability effectively determines the maximum positive electrode potential that can be achieved in a cell. As such, it is advantageous if the electrolyte is stable at high potentials of at least 4V vs Li/Li$^+$, preferably at least 4.2V vs Li/Li$^+$ and even more preferably at least 5 V vs Li/Li$^+$. Having high oxidative stability facilitates the use of high potential cathode materials. In the case of the polymer electrolytes disclosed herein oxidation stability is dependent on the electron acceptor used to form the polymer charge-transfer complex. As described in Example 7 the PPS-TFBQ containing polymer electrolyte reaches 5.4 V vs Li/Li$^+$. Such a high stability against oxidation would allow for the utilization of a larger fraction of the theoretical capacity of certain conventional Li-ion cathode materials, such as NMC, that are normally limited by the approximately 4.3 V oxidative stability of the conventional liquid electrolyte.

Figure 26:
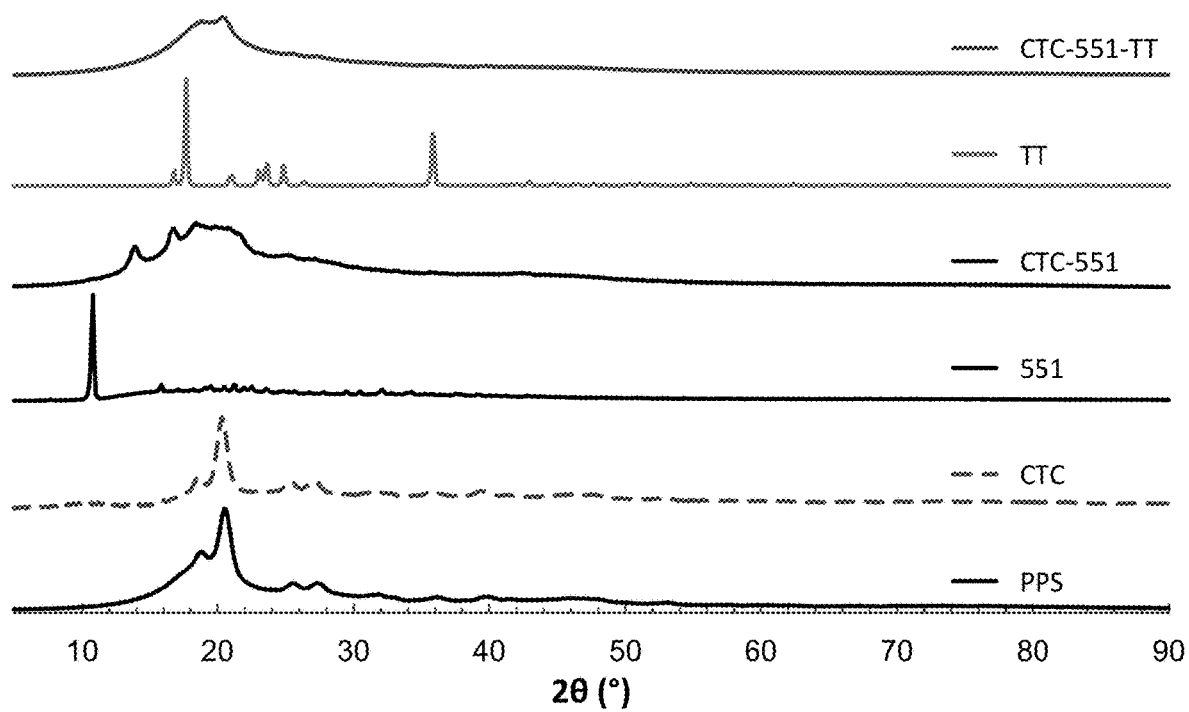
FIG. 26 shows the crystal character of the composition according to an embodiment.

The choice and effect of the additive having a dielectric constant of 10 or greater to substantially increase the ionic conductivity of the polymer electrolyte composition was previously described. An unexpected and surprising effect of the additive is shown in FIG. 26. The additive thietane-1,1-dioxide (TT) is a cyclic sulfone with a melting point of $T_m$=74° C. When the TT is incorporated into a polymer electrolyte as an additive, the thietane-1,1-dioxide which has definitive crystallinity as shown by the X-ray diffraction scan turns amorphous in the mixture. Similarly, the slight crystallinity of the poly(phenylene sulfide) also diminishes to the point that the final composition is substantially amorphous as indicated in the uppermost scan.

Figure 27:
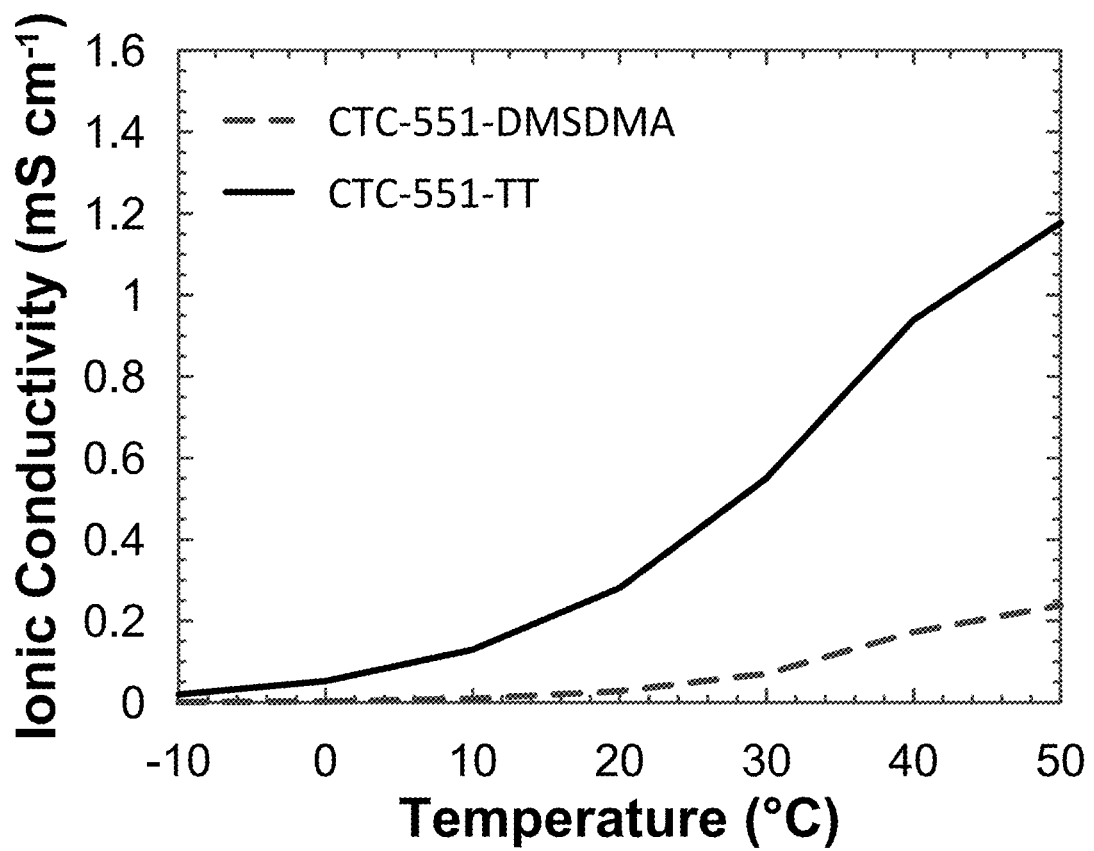
FIG. 27 shows the Ionic conductivity of a charge-transfer complex (CTC)-based polymer electrolyte with thietane-1,1-dioxide (TT) additive in comparison to a (dimethylsulfamoyl)dimethylamine (DMSDMA) additive.

In comparison, the additive dimethylsulfamoyl)dimethylamine (DMSDMA) is a linear sulfone with a very similar melting point ($T_m$=71° C.), but FIG. 27 demonstrates that it only supports an ionic conductivity of about 0.05 mS/cm at 25° C., significantly less than the 0.42 ms/cm obtained with TT.

Figure 28:
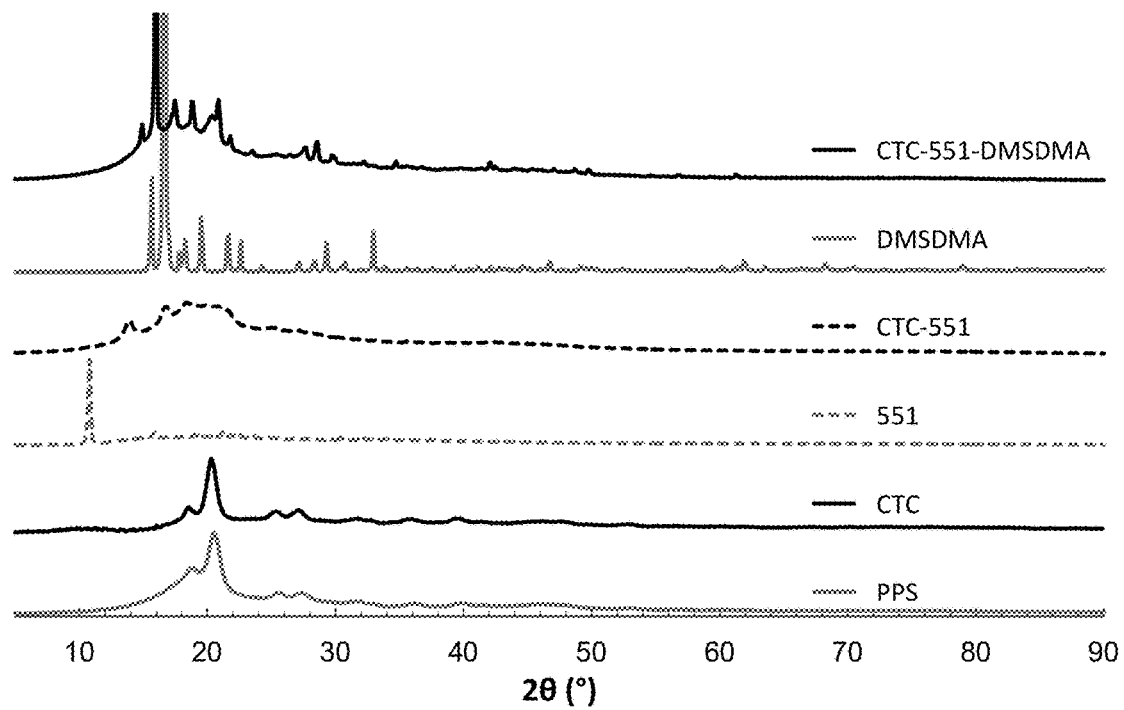
FIG. 28 shows the X-ray diffraction scans of components of charge-transfer complex (CTC) composition containing the additive: (dimethylsulfamoyl)dimethylamine (DMSDMA).

Also, in contrast to TT, FIG. 28 shows that (dimethylsulfamoyl)dimethylamine (grey line) retains a crystalline structure (i.e. sharp peaks) when combined with the lithium salts and charge-transfer complex (black line).

Figure 31:
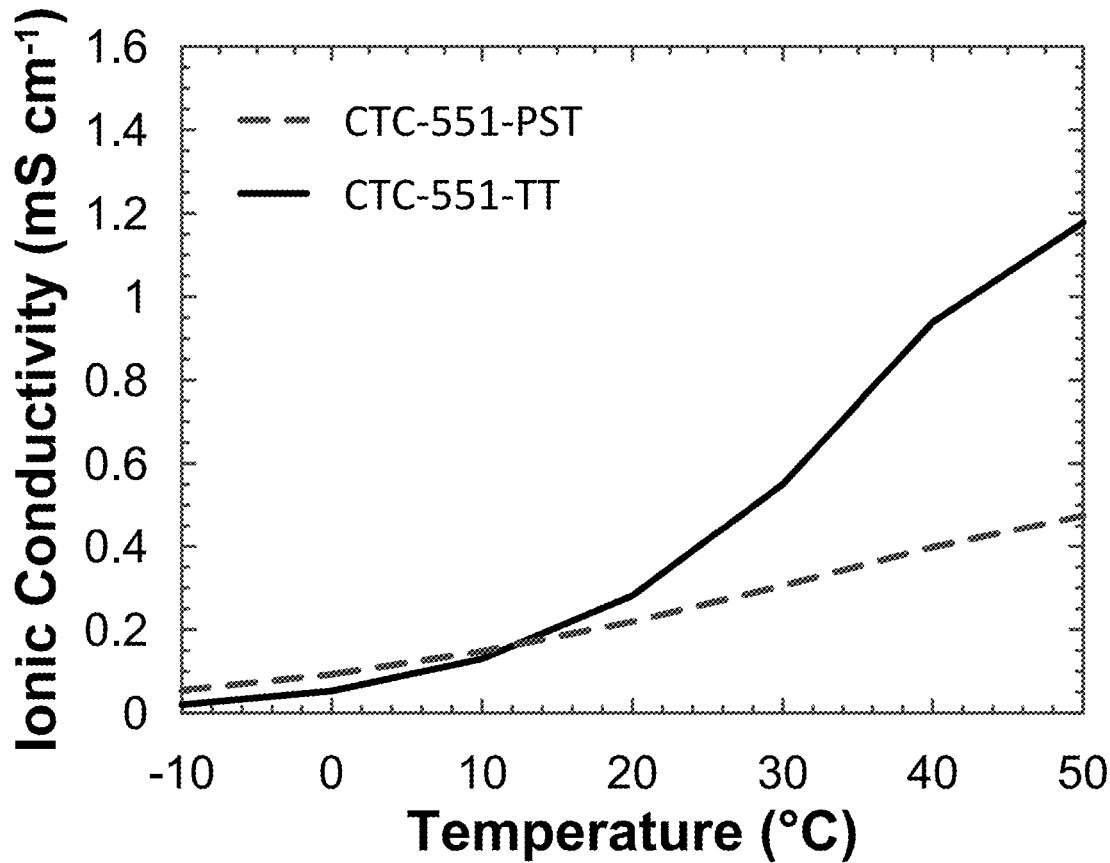
FIG. 31 shows the Ionic conductivity of a charge-transfer complex (CTC)-based polymer electrolyte with either a thietane-1,1-dioxide (TT) additive or a 1,3-propane sultone (PST) additive.

The additive 1,3-propane sultone (PST) is a cyclic molecule with a melting point of $T_m=31°$ C. At 25° C., a polymer electrolyte with PST as the additive supports an ionic conductivity 0.27 mS/cm, as shown in FIG. 31, which is less than a comparable polymer electrolyte containing thietane-1,1-dioxide.

Figure 32:
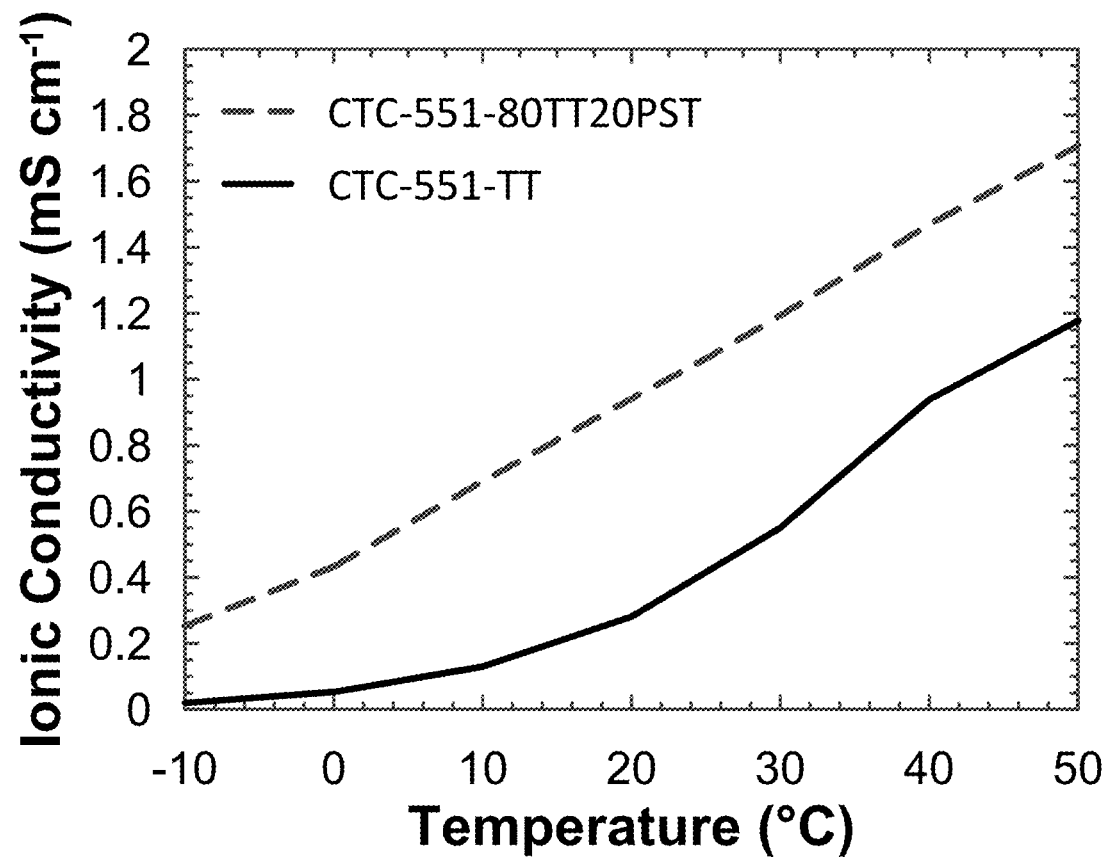
FIG. 32 shows the ionic conductivity of a charge-transfer complex (CTC)-based polymer electrolyte with either a thietane-1,1-dioxide (TT) additive or a blend of 80 wt % TT and 20 wt % 1,3-propane sultone (PST).
Figure 33:
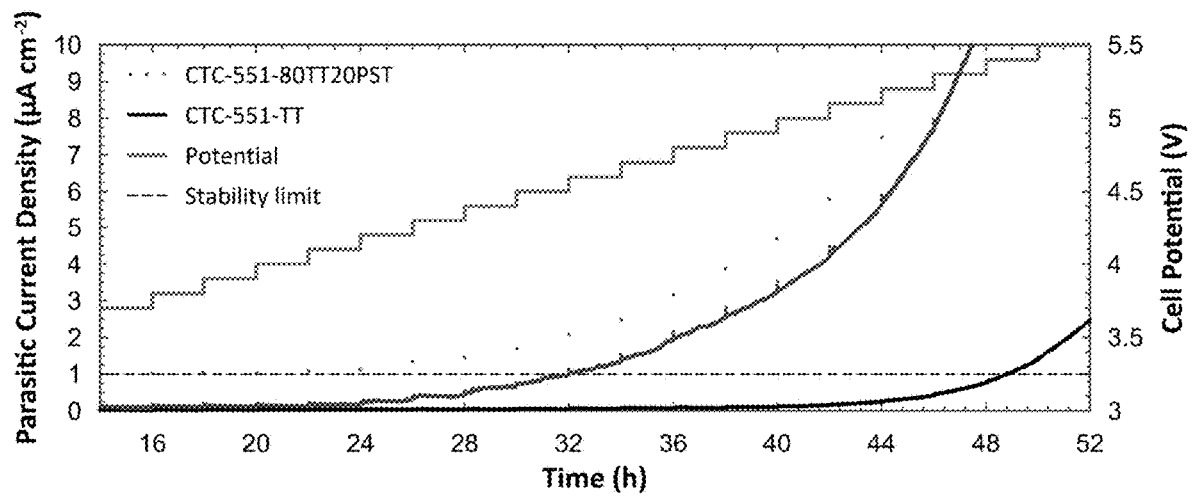
FIG. 33 shows the Oxidative stability of charge-transfer complex (CTC)-based polymer electrolytes with either a thietane-1,1-dioxide (TT) additive or a blend of 80 wt % TT and 20 wt % 1,3-propane sultone (PST).

However, a polymer electrolyte containing a blend of these two additives in a ratio of 80 wt % thietane-1,1-dioxide to 20 wt % 1,3-propane sultone can support an enhanced ionic conductivity of 1.06 mS/cm at 25° C., as shown by the dashed grey line in FIG. 32. This advantage in ionic conductivity may be offset by the indication of FIG. 33 that a polymer electrolyte containing an additive blend comprised of 80 wt % thietane-1,1-dioxide and 20 wt % 1,3-propane sultone was oxidatively stable to 4.6 V vs Li/Li$^+$ (grey dotted line), in comparison to a polymer electrolyte containing a 100 wt % thietane-1,1-dioxide additive (black line) which is stable up to 5.4 V vs Li/Li$^+$.

Figure 34:
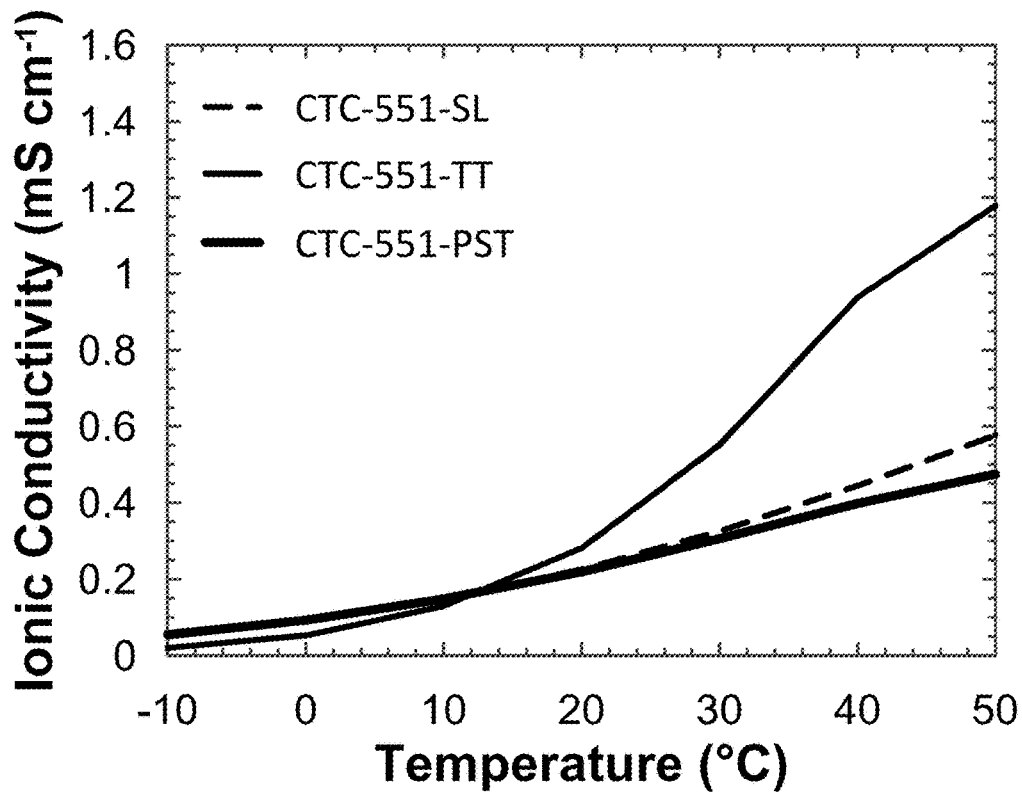
FIG. 34 shows the Ionic conductivity of a charge-transfer complex (CTC)-based polymer electrolyte with an additive that is thietane-1,1-dioxide (TT), sulfolane (SL) or 1,3-propane sultone (PST).
Figure 35:
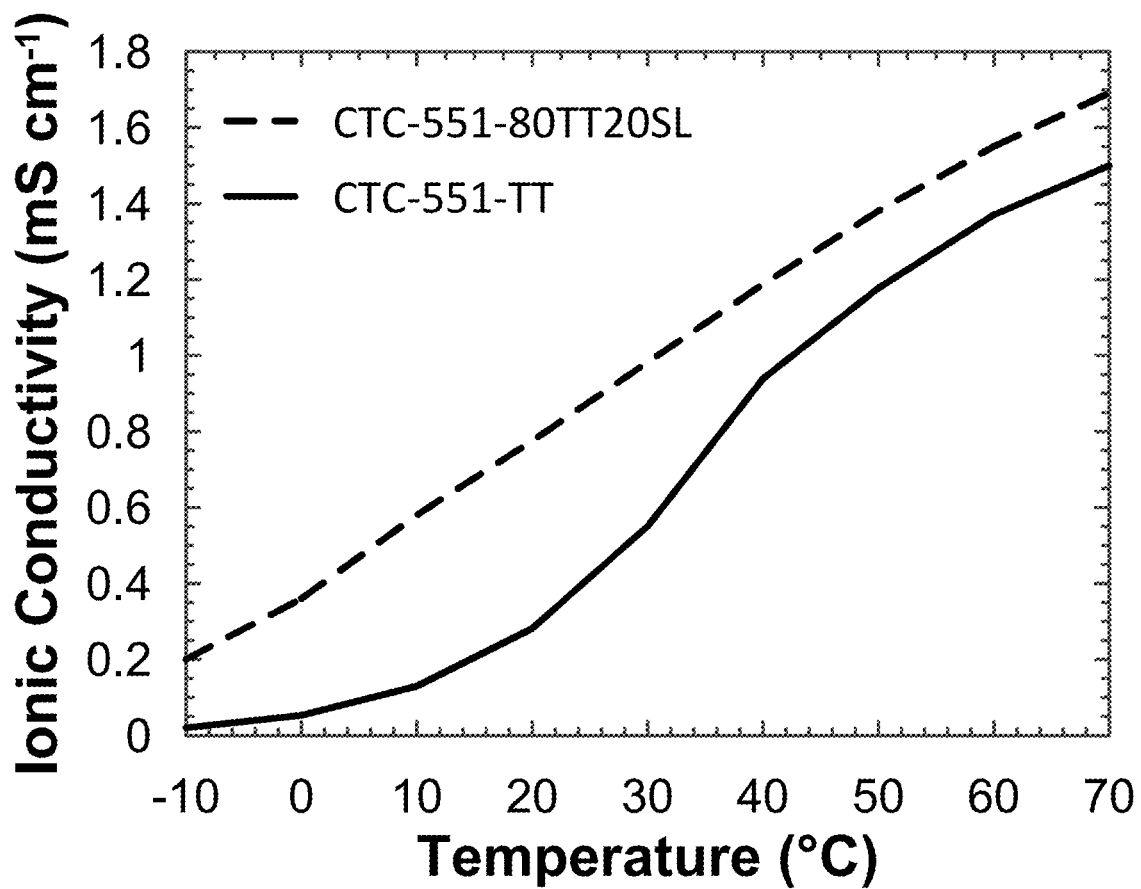
FIG. 35 shows the Ionic conductivity of a charge-transfer complex (CTC)-based polymer electrolyte with either a thietane-1,1-dioxide (TT) additive or a blend of 80 wt % TT and 20 wt % sulfolane (SL).

Other blends of additives are also possible. One example may include the additive, sulfolane, which is a cyclic sulfone with a five-membered ring. FIG. 34 demonstrates that a polymer electrolyte made using sulfolane as the additive (SL, dashed line) supports an ionic conductivity very similar to that of a polymer electrolyte made using 1,3-propane sultone (PST, dotted line) but less than that of a polymer electrolyte made using thietane-1,1-dioxide (TT, solid line) at temperatures higher than about 15° C. However, FIG. 35 shows that a polymer electrolyte containing an additive blend of 80 wt % thietane-1,1-dioxide and 20 wt % sulfolane supports an ionic conductivity higher than that of a polymer electrolyte utilizing thietane-1,1-dioxide exclusively, even up to 70° C.

Figure 36:
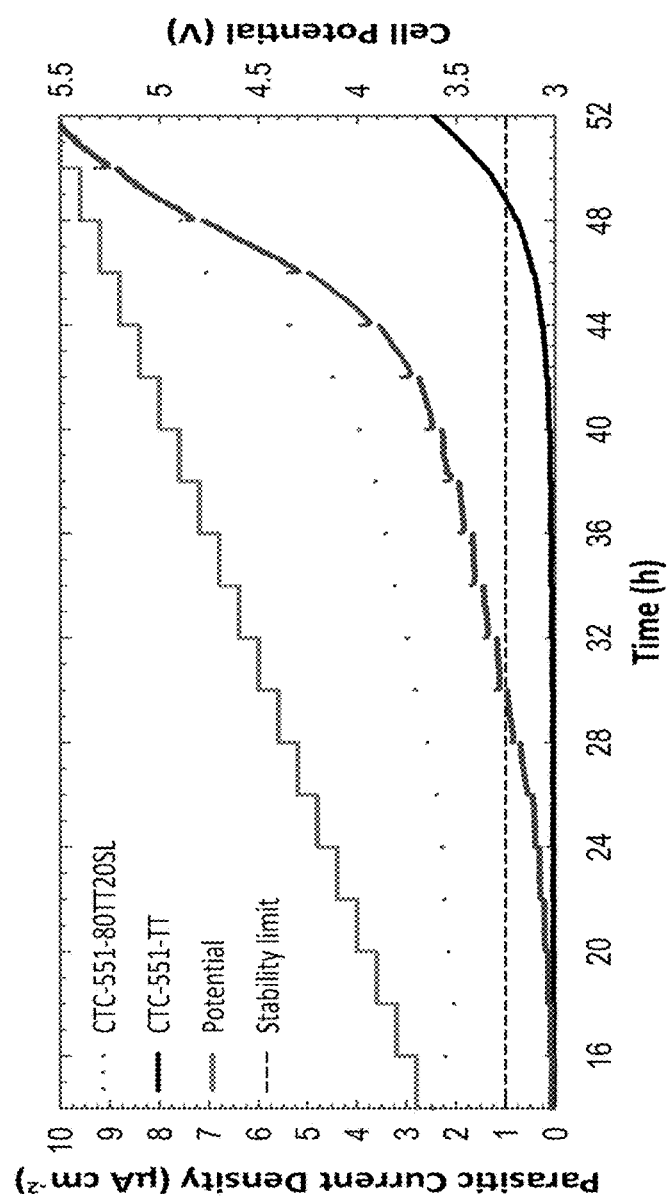
FIG. 36 shows the oxidative stability of charge-transfer complex (CTC)-based polymer electrolytes with either a thietane-1,1-dioxide (TT) additive or a blend of 80 wt % TT and 20 wt % sulfolane (SL).

The oxidative stability of the polymer electrolyte with an 80 wt % TT and 20 wt % SL additive was measured, as shown in FIG. 36, to be about 4.5 V vs Li/Li$^+$, which is similar to the oxidative stability of a polymer electrolyte with 80 wt % TT and 20 wt % PST additive.

In selected utilities other additives conventionally employed with electrolyte compositions and known in the art may be included on the composition in an amount which does not adversely affect the performance of the composition as described. In some applications it may be useful to add non-electron donor polymers to the composition. Exemplary additive polymers may include but are not limited to poly(methyl acrylate), poly(methyl methacrylate), poly(ethyl acrylate), poly(propyl acrylate), poly(butyl acrylate), poly(pentyl acrylate), poly(methyl vinyl sulfone), poly(ethyl vinyl sulfone), poly(acrylonitrile) and poly(methacrylonitrile).

In one embodiment the present disclosure provides a solid state lithium ion battery, comprising: an anode capable of insertion and extraction of Li$^+$ ions; a cathode capable of insertion and extraction of Li$^+$ ions; and a solid state electrolyte between the anode and cathode comprising the polymer electrolyte composition described herein; wherein the at least one metal salt is a lithium salt.

The anode may be any anode structure conventionally employed in a lithium ion battery or lithium metal battery. Example anode active materials may include lithium, a lithium alloy, graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide (NMC). Other active cathode materials may also include elemental sulfur and metal sulfide composites. The cathode may also include a current collector such as copper, aluminum and stainless steel. Alternative chalcogenides to sulfur such as selenium and tellurium may also be employed as active cathode materials. Mixtures of any of these may also be employed.

As described throughout this disclosure the polymer electrolyte compositions according to the various embodiments and aspects described herein may be useful in any utility where metal ion conductivity and low electrical conductivity is required. Therefore, these polymer electrolyte compositions may be useful as components of electrode compositions.

In an embodiment the present disclosure provides an electrode for a lithium ion battery, comprising: an active material capable of insertion and extraction of Li$^+$ ions; a carbon conductive additive; and the polymer electrolyte composition of any of the embodiments and aspects described herein the at least one metal salt is a lithium salt; and a binder.

Examples of conductive carbon include but are not limited to Ketjen black (carbon black), acetylene black, vapor grown carbon fiber, graphene, natural graphite, artificial graphite and activated carbon.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

In one aspect, the electrode is a positive electrode, and the active material is at least one selected from the group consisting of lithium cobalt oxide (LiCoO$_2$), lithium manganese oxide (LiMn$_2$O$_4$), lithium iron phosphate (LiFePO$_4$), lithium nickel manganese cobalt oxide, elemental sulfur and a metal sulfide composite. A a wt % of the active material may be from 40 wt % to 98 wt %, and a wt % of the polymer electrolyte composition may be from 5 wt % to 50 wt %.

In one aspect, the electrode is a negative electrode, and the active material is at least one selected from the group consisting of lithium, a lithium alloy, graphite, hard carbon, lithium titanate (LTO), a tin/cobalt alloy and a silicon/carbon composite. A a wt % of the active material may be from 40 wt % to 98 wt %, and a wt % of the polymer electrolyte composition may be from 5 wt % to 50 wt %.

The above description is presented to enable a person skilled in the art to make and use the embodiments and aspects of the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

EXAMPLES

Example 1

Tetrafluoro-1,4-benzoquinone (TFBQ, an oxidizing agent) was dissolved in acetonitrile, within a microwave test tube. Poly(phenylene sulfide) (PPS) was then added to the test tube in any PPS:TFBQ molar ratio from 1:1 to 30:1. The tube was then sealed before heating and stirring the mixture in a microwave at between 20° C. and 160° C. for 10 minutes to 96 hours. The reaction time was inversely dependent on the temperature. The previously white PPS became violet, indicating that the charge-transfer complex was formed. After removing the solvent, the resulting material was combined with an additive and lithium salts. This was accomplished using a planetary mixer, with or without milling media added to aid the mixing process.

Example 2

The redox reaction of the polymer and oxidizing agent was carried out using a gaseous oxidizer. PPS and TFBQ were added to a mortar in any molar ratio from 1:1 to 30:1. The mixture was ground for 15 min and then transferred into a quartz tube that was then sealed. The quartz tube was then placed in an oven and heated at 80° C. to 300° C. for 4 to 24 h. At these temperatures, TFBQ sublimated and reacted with the solid PPS. Originally white, the material changed to a violet colour and then brown colour, signifying the formation of the charge-transfer complex. The charge-transfer complex was then combined with lithium salts and an additive using an acoustic mixer, with or without milling media.

Example 3

PPS and TFBQ were added to a ball mill jar in any molar ratio from 1:2 to 30:1, along with milling media. The mixture was then ball-milled for 15 min to 48 hours. The resulting powder was transferred to a test tube, which was sealed and heated at 80° C. to 300° C. for 4 to 24 h. Originally white, the material changed first to a violet and then brown colour, signifying the formation of the charge-transfer complex. The charge-transfer complex was then combined with lithium salts and an additive using an acoustic mixer, with or without milling media.

Example 4

PPS and TFBQ were added to an acoustic mixing jar in any molar ratio from 1:2 to 30:1, along with milling media and a solvent, such as acetonitrile. The mixture was then acoustic-mixed for 15 min to 24 hours. Afterward, the resulting violet-coloured mixture was transferred to a test tube, which was sealed with a cap containing a septum. The test tube was heated at between 80° C. and 300° C. for 4 to 24 h with argon gas flowing into and out of the test tube to carry vapors away. The material changed to a brown colour during heating. The charge-transfer complex was then combined with lithium salts and an additive using an acoustic mixer, with or without milling media.

Example 5

Any oxidizing agent capable of oxidizing the polymer will suffice. For example, tetracyanoethylene (TCNE) can be used to oxidize PPS. PPS and TCNE are added to a ball mill jar in any molar ratio from 1:2 to 30:1, along with milling media. The mixture is then ball-milled for 15 min to 48 hours. The resulting powder is then transferred to a test tube, which is then sealed and heated at 80° C. to 300° C. for 4 to 24 h. Originally white, the material changes first to a blue and then black colour, signifying the formation of the charge-transfer complex. The charge-transfer complex is then combined with lithium salts and an additive. This can be accomplished using an planetary mixer, with or without milling media.

Example 6

Analysis of Charge-Transfer Complex of Poly(Phenylene Sulfide) (PPS) and Tetrafluoro-1,4-benzoquinone (TFBQ Magic Angle Spinning Solid-State Nuclear Magnetic Resonance (MAS NMR)

Figure 8A:
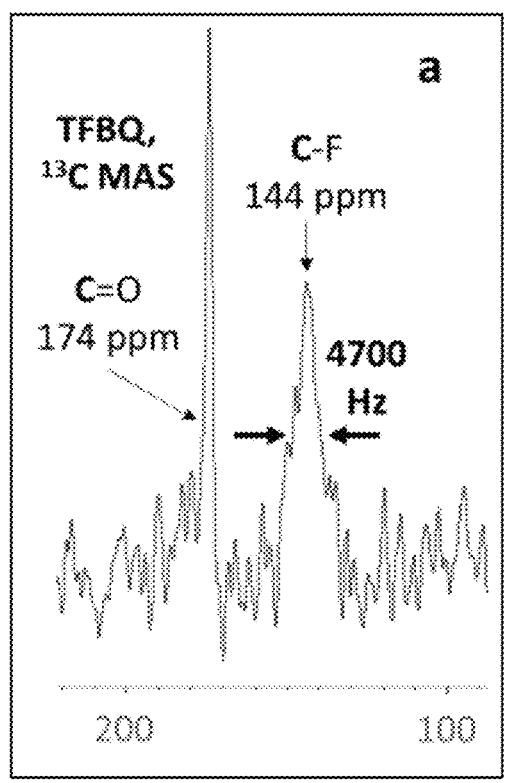
FIG. 8A shows the $^{13}C$-$^{19}F$ cross-polarization magic angle spinning (CPMAS) nuclear magnetic resonance (NMR) spectrum of TFBQ.
Figure 8B:
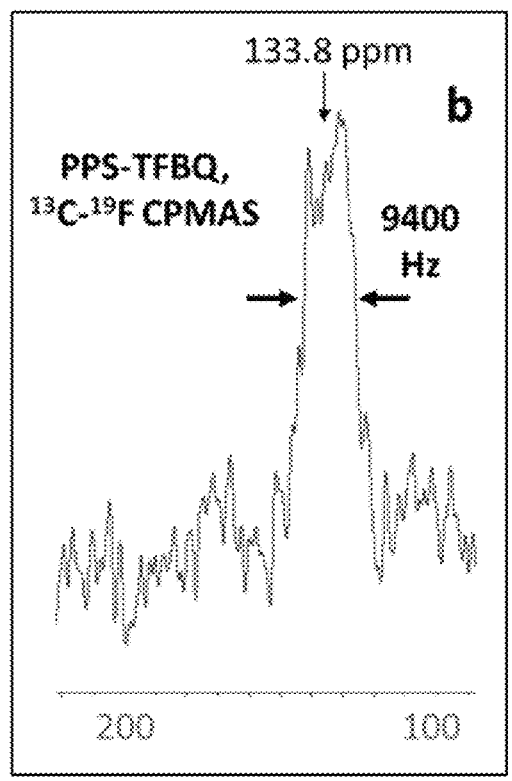
FIG. 8B shows the $^{13}C$-$^{19}F$ CPMAS NMR spectrum of the PPS-TFBQ charge-transfer complex.

FIG. 8A depicts the $^{13}$C-$^{19}$F CPMAS NMR spectrum of TFBQ prior to reaction and after reaction (FIG. 8B). A comparison of FIG. 8A to 8B supports the oxidation of PPS and reduction of TFBQ to form the PPS-TFBQ CTC because: 1) The 174 ppm peak in the $^{13}$C NMR spectrum of TFBQ (FIG. 8A), assigned to C=O carbon, is not present after the reaction (FIG. 8B), which is consistent with its reduction into C—O$^-$ in the CTC. 2) The 144 ppm C-F TFBQ peak (FIG. 8A) shifted during the reaction to a band centered at about 133.8 ppm in the PPS-TFBQ complex (FIG. 8B), which is consistent with an increase in the electron density of the TFBQ molecules. 3) The half-width of the C-F peak increased from 4700 Hz in the neutral TFBQ (FIG. 8A) to 9400 Hz in the PPS-TFBQ product (FIG. 8B), which is consistent with the presence of unpaired electrons in radical anions, such as TFBQ•— in the CTC, that cause paramagnetic line broadening.

Thermogravimetric Analysis

Figure 9:
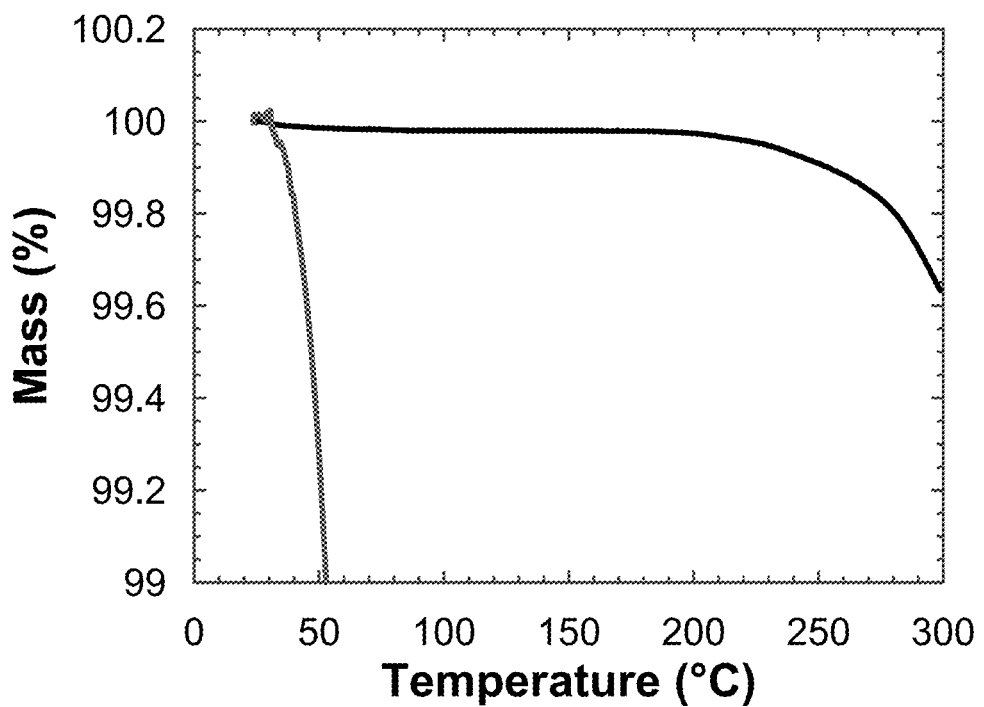
FIG. 9 shows a TGA comparison of tetrafluoro-1,4-benzoquinone (TFBQ) and the PPS-TFBQ charge-transfer complex.

The thermogravimetric analysis (TGA) scan of the PPS-TFBQ complex (solid line) is shown in FIG. 9. As indicated the complex product lost only 0.02 wt % by 210° C. Since TFBQ (dotted line) sublimates at about 185° C., it can be concluded that no free unreacted TFBQ remained in the complex product.

X-Ray Diffraction (XRD)

Figure 10:
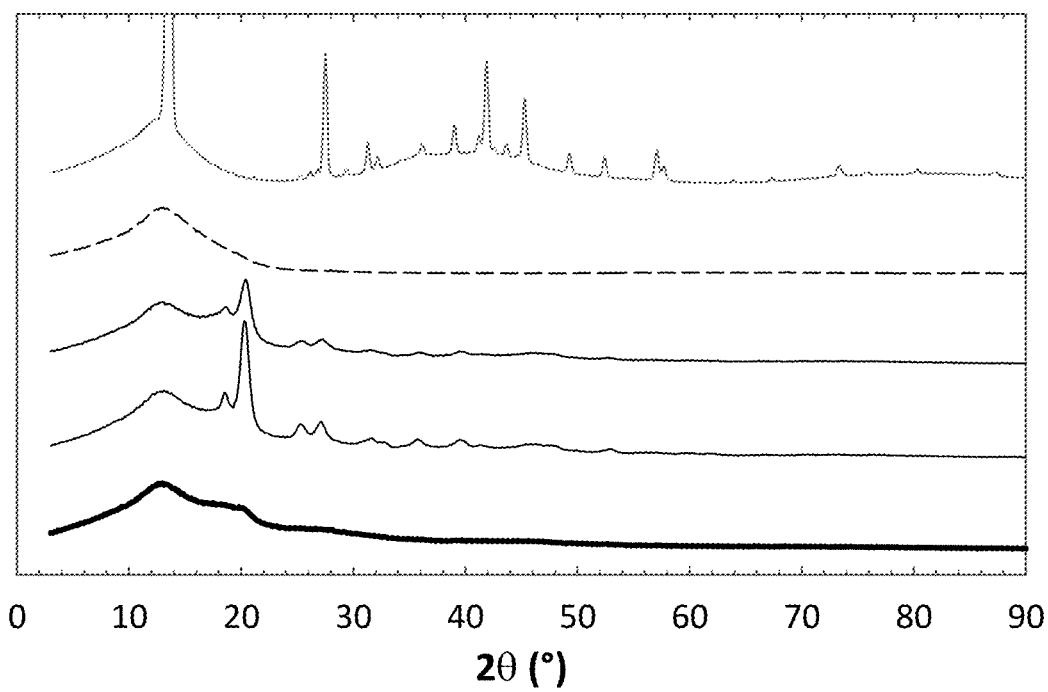
FIG. 10 shows X-ray diffraction scans of components of charge-transfer complex based electrolytes.

FIG. 10 shows the XRD scans of TFBQ (grey line), background (dashed line), PPS (dotted line), the charge-transfer complex (CTC) (black line) and the polymer electrolyte (thick black line). The absence of any TFBQ peaks in the scan of the charge-transfer complex indicate that all TFBQ has been reacted or driven off during synthesis. In fact, the charge-transfer complex scan appears nearly identical to the PPS scan, with some peak narrowing indicating some crystallization of the PPS during CTC synthesis. However, the lack of any CTC peaks in the scan of the final polymer electrolyte (thick black line) reveals that the crystallinity of the CTC is mostly converted to amorphous material during processing. As such, the crystallinity of the original polymer material is unimportant.

Differential Scanning Calorimetry

Figure 11:
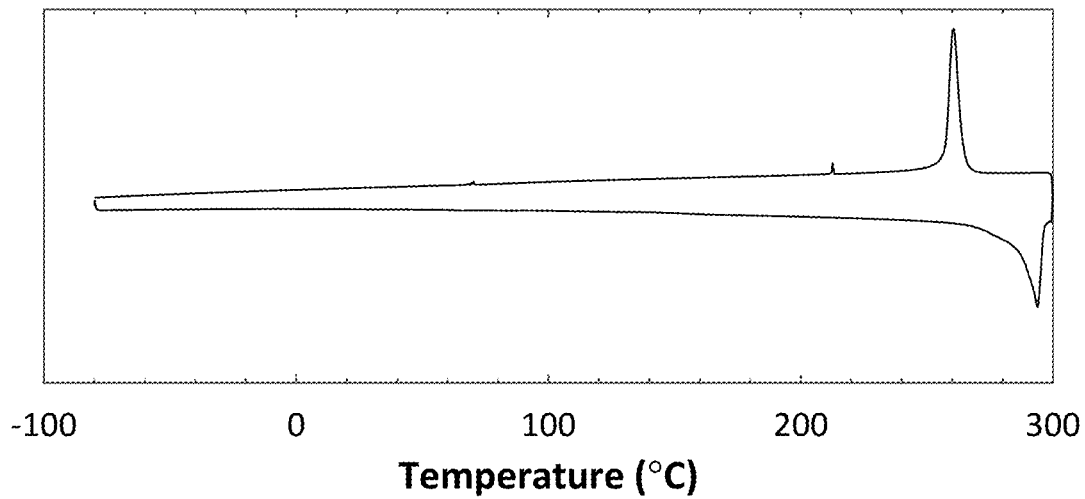
FIG. 11 shows the DSC curve of PPS.
Figure 12:
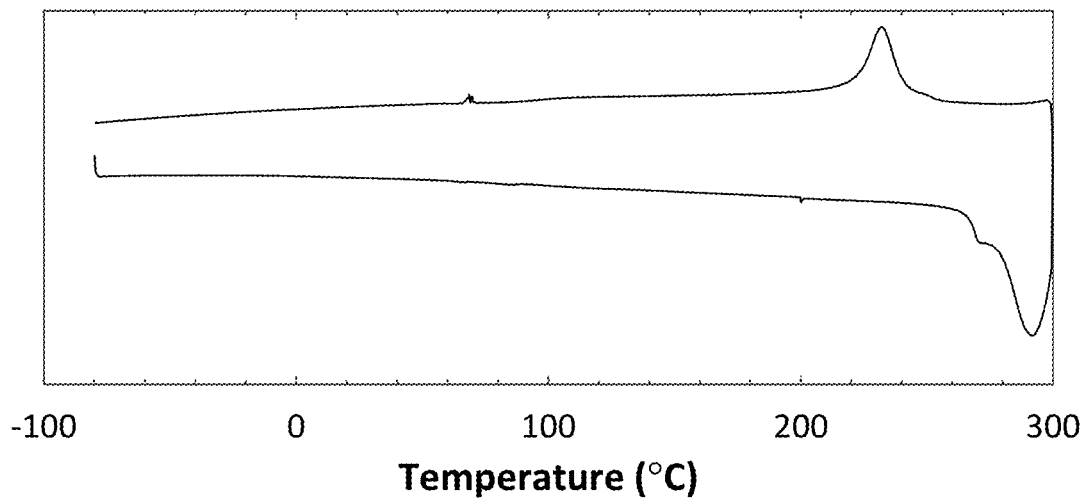
FIG. 12 shows the DSC curve of the PPS-TFBQ charge-transfer complex.

DSC also reveals a change in behavior between PPS and the charge-transfer complex. FIG. 11 shows that the melting point of pure PPS is about 285° C., while that of the PPS-TFBQ charge-transfer complex, shown in FIG. 12, is 276° C., which is 9° C. cooler than pure PPS. The freezing point is also shifted; PPS-TFBQ charge-transfer complex has a freezing point of about 243° C. (FIG. 12, upper scan) while that of PPS is about 265° C. (FIG. 11, upper scan).

Electrical Conductivity of the PPS-TFBQ Charge-Transfer Complex

Figure 13:
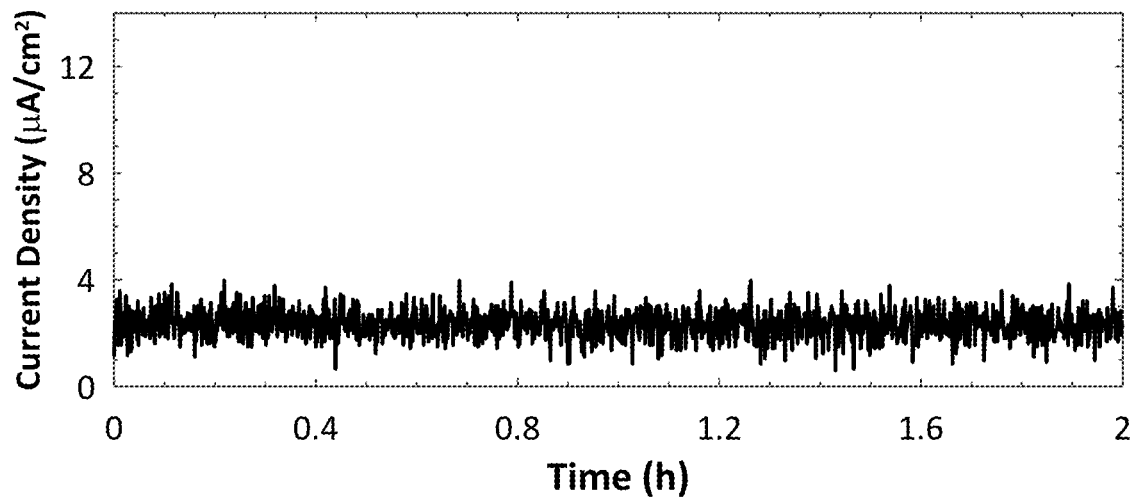
FIG. 13 shows the electrical conductivity of a PPS-TFBQ charge-transfer complex.

FIG. 13 shows the electrical conductivity of a 1.074 mm thick pellet of the PPS-TFBQ charge-transfer complex when measured by applying a 100 mV potential across the pellet measuring the resulting current density. The electrical conductivity was determined to be 2.5 nS/cm using σ=iL/V, where i is the current density, L is the thickness of the pellet and V is the applied potential difference.

Ionic Conductivity—Impedance Spectroscopy (PPS-TFBQ Doped with Li-Salt)

Figure 14:
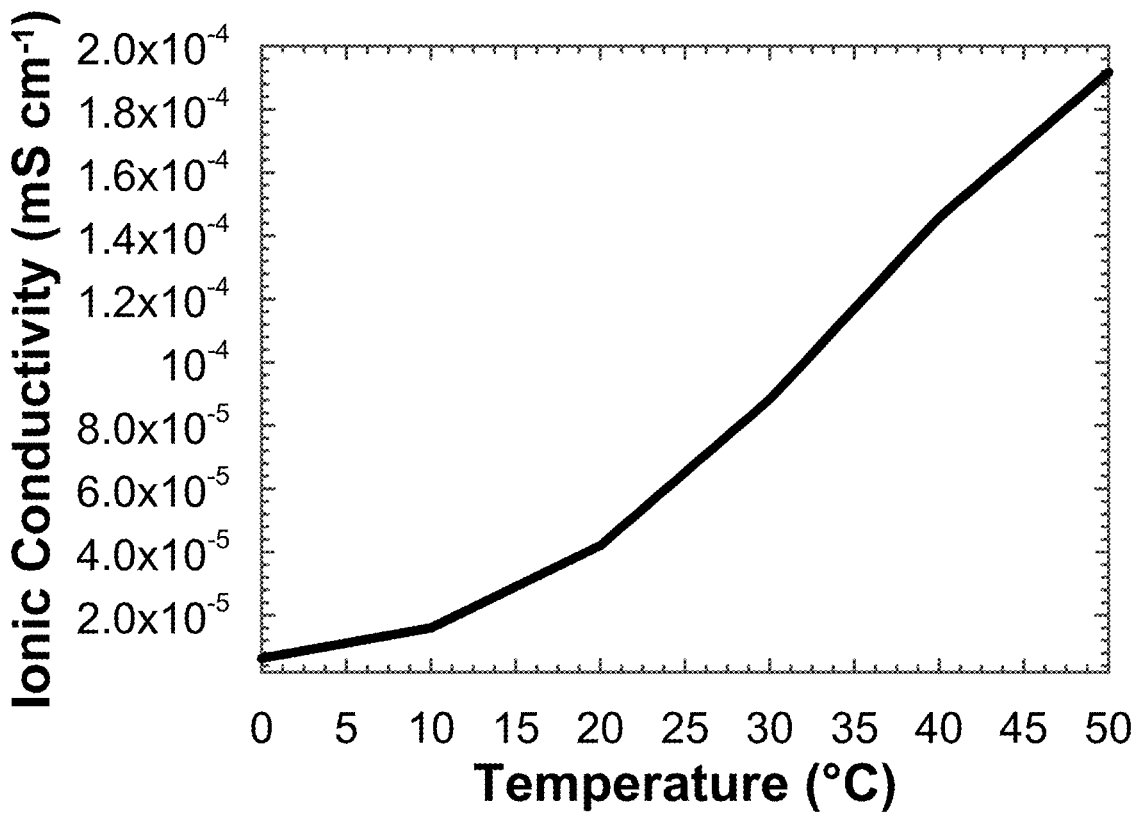
FIG. 14 shows the ionic conductivity of a mixture of a PPS-TFBQ charge-transfer complex (CTC)-and a lithium salt.

A mixture of a 5:5:1 molar mixture of LiTFSI:LiFSI:LiBOB was added to the PPS-TFBQ charge-transfer complex through ball milling and the resulting Li-salt-doped, polymeric powder was pressed into a pellet and placed between two stainless steel surfaces. Impedance spectroscopy was used to measure the ionic conductivity between 0 and 50° C. and the results are shown in FIG. 14. The ionic conductivity is relatively low, supporting only about 6.5× $10^{-8}$ S/cm at 25° C.

Ionic Conductivity—Impedance Spectroscopy (PPS-TFBQ Doped with Li-Salt and Additive Having a Dielectric Constant of 10 or Greater)

Figure 15:
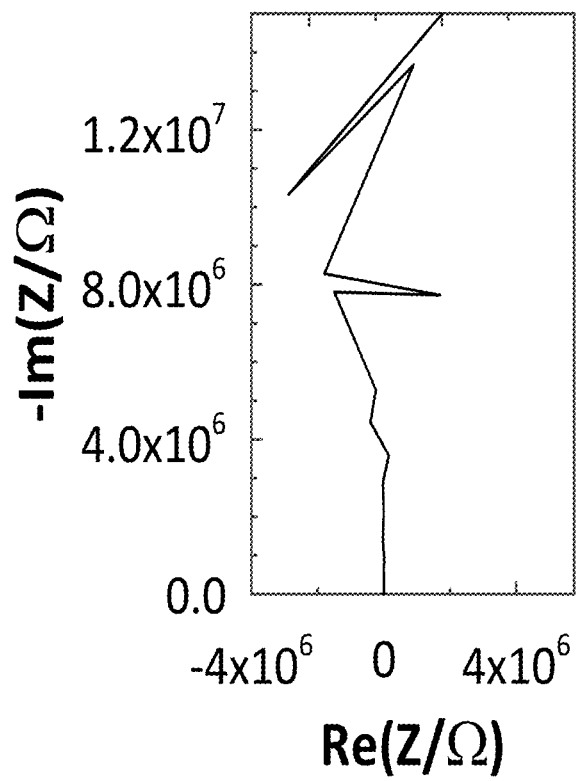
FIG. 15 shows a Nyquist impedance of a mixture of a charge-transfer complex and lithium salts.
Figure 16:
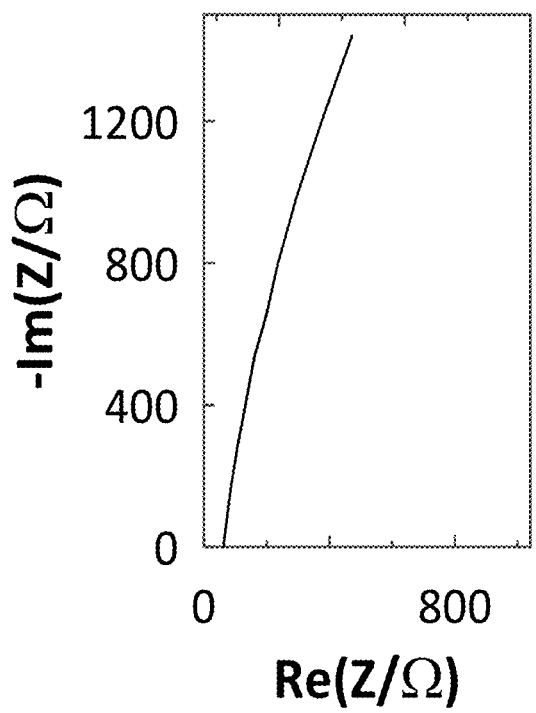
FIG. 16 shows a Nyquist impedance of a mixture of a charge-transfer complex, lithium salts and an additive having a dielectric constant of 10 or greater.
Figure 17:
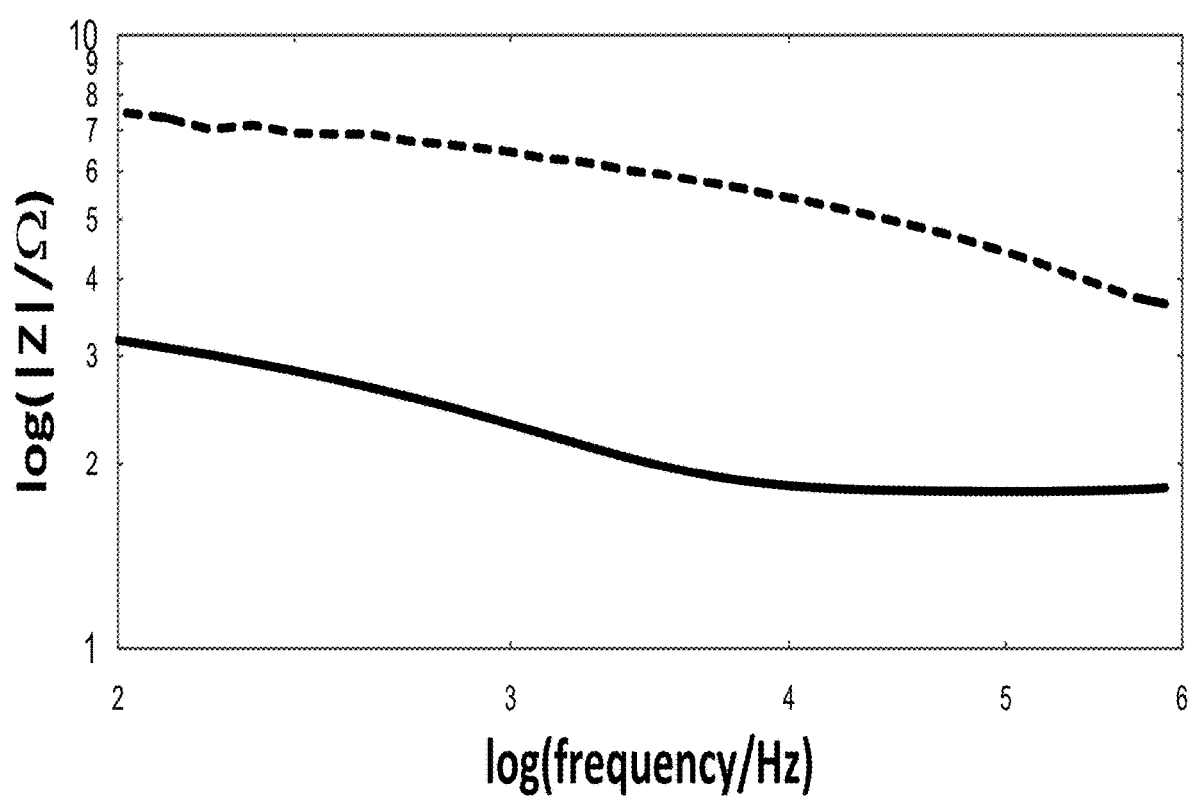
FIG. 17 shows the Bode impedance of a mixture of a charge-transfer complex and lithium salts and a mixture of a charge-transfer complex, lithium salts and an additive.

The mixture of a 5:5:1 molar mixture of LiTFSI:LiFSI:LiBOB and PPS-TFBQ charge-transfer complex described above was further mixed with thietane-1,1-dioxide (TT) as an additive compound having a dielectric constant of 10 or greater. The high-frequency resistance (real impedance) of a pellet of PPS-TFBQ charge-transfer complex doped with Li-salts is shown in FIG. 15 and the real impedance of the sample with the additive is shown in FIG. 16. The real impedance was reduced from about 5 kΩ (FIG. 15) to about 0.1 kΩ (FIG. 16) with the inclusion of the additive. This is shown more clearly in FIG. 17, where the total impedance across the pellet is shown on the y-axis over the frequency range measured. The doped charge-transfer complex is the dashed line while the solid black line is the charge-transfer complex combined with both lithium salts and an additive. This demonstrated that the "polymer electrolyte" of this disclosure is the mixture of a charge-transfer complex, lithium salt and an additive having a dielectric constant of 10 or greater.

Figure 18:
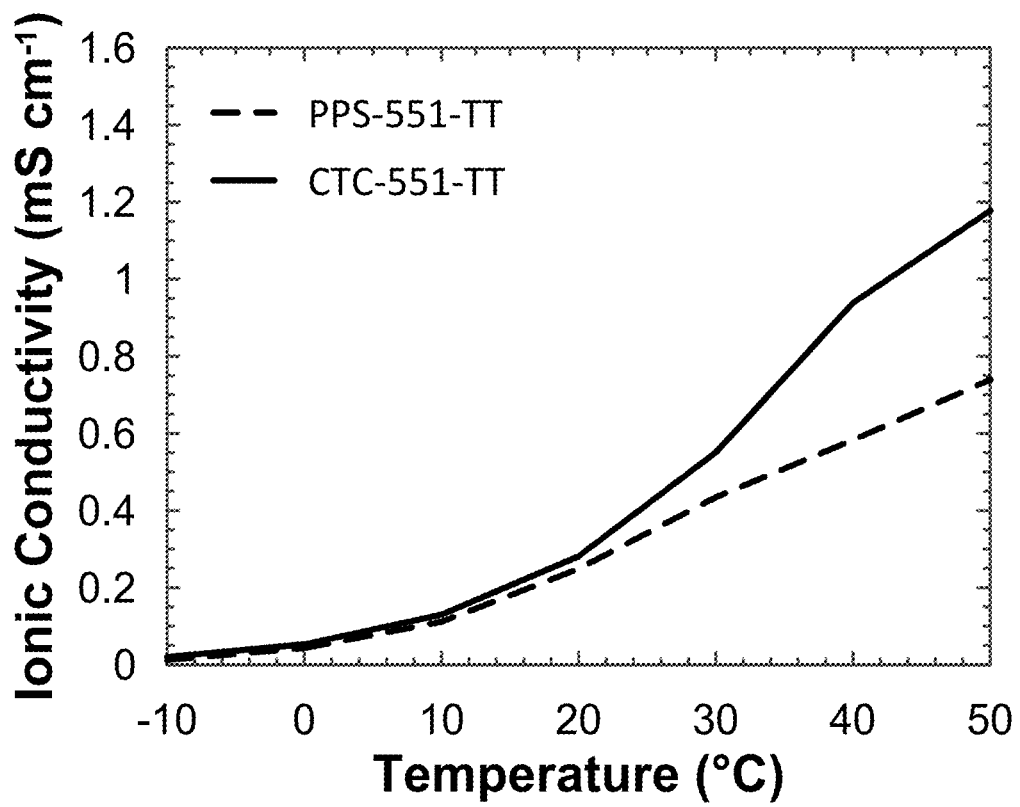
FIG. 18 shows the ionic conductivity of a composition of one embodiment.

To further demonstrate the criticality of the combination of the polymer charge-transfer complex, lithium salt and additive having a dielectric constant of 10 or greater the ionic conductivities of a mixture of poly(phenylene sulfide, a 5:5:1 molar mixture of LiTFSI:LiFSI:LiBOB and thietane-1,1-dioxide (TT) and a mixture of a PPS-TFBQ charge-transfer complex, a 5:5:1 molar mixture of LiTFSI:LiFSI:LiBOB and thietane-1,1-dioxide (TT) were compared. FIG. 18 demonstrates that the ionic conductivity of the polymer electrolyte with a charge-transfer complex (CTC-551-TT, black line) supports a higher ionic conductivity than a polymer mixture made with poly(phenylene sulfide) particles (PPS-551-TT, dashed line) above 20° C.

Electrical Conductivity of Polymer Electrolytes

Figure 19:
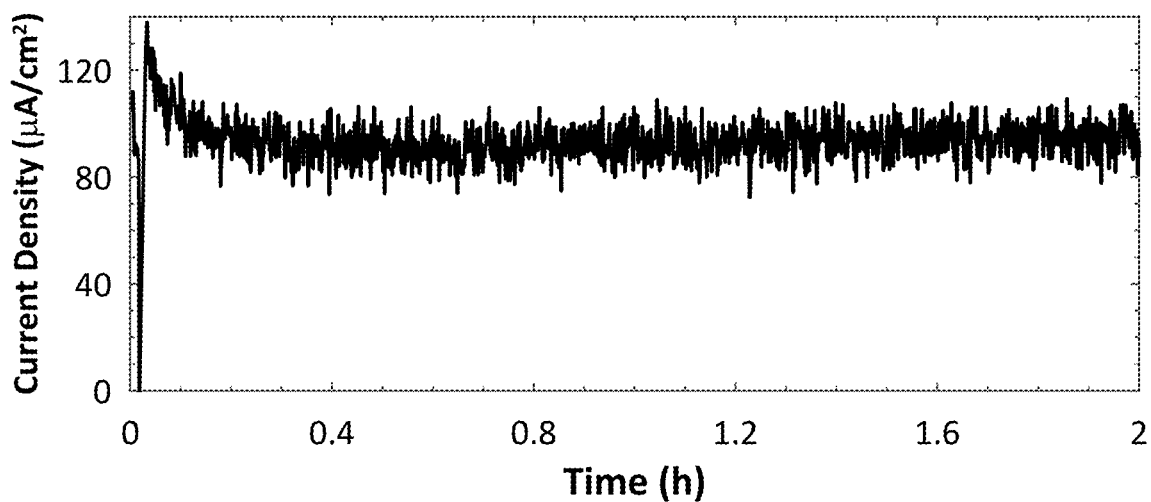
FIG. 19 the electrical conductivity measurement of a polymer electrolyte containing a PPS-TCNE charge-transfer complex.
Figure 20:
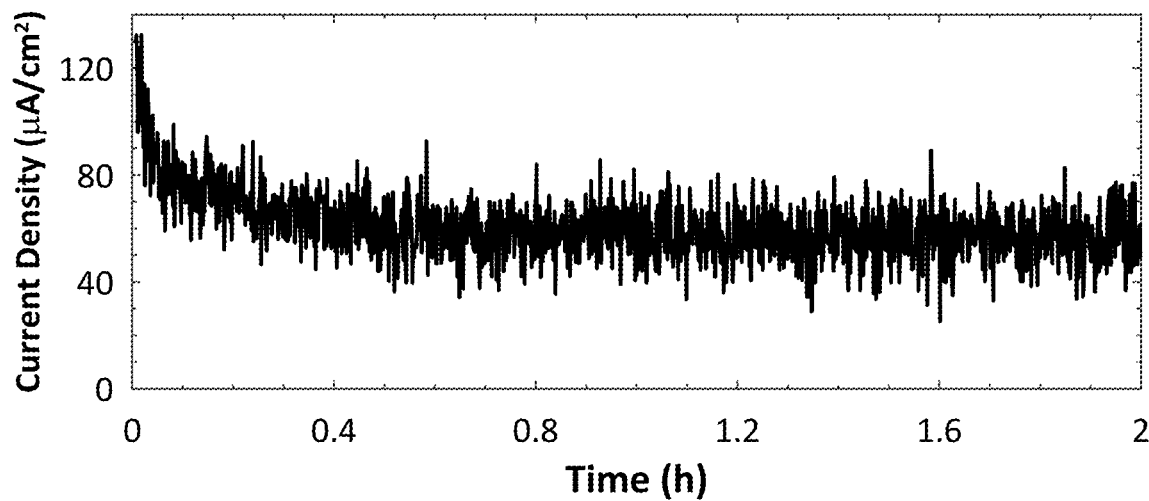
FIG. 20 shows the electrical conductivity measurement of a polymer electrolyte containing PPS-TFBQ charge-transfer complex.

To demonstrate that addition of the additive having a dielectric constant of 10 or greater does not increase the electrical conductivity of the polymer electrolyte mixture, the electrical conductivities of a mixture of a PPS-TCNE charge-transfer complex, a 5:5:1 molar mixture of LiTFSI:LiFSI:LiBOB and thietane-1,1-dioxide (TT) (FIG. 19) and a mixture of a PPS-TFBQ charge-transfer complex, a 5:5:1 molar mixture of LiTFSI:LiFSI:LiBOB and thietane-1,1-dioxide (TT) (FIG. 20) were measured. To conduct each measurement 100 mV was applied across a pellet of electrolyte and the current density through the pellet over 2 hours was measured. The addition of an additive did not significantly affect the electrical conductivity. FIG. 19 shows that a polymer electrolyte made with a PPS-TCNE charge-transfer complex supported an electrical conductivity of only 28.1 nS/cm. Similarly, a polymer electrolyte made with a PPS-TFBQ charge-transfer complex, as shown in FIG. 20, supported an electrical conductivity of only 31.8 nS/cm.

Example 7

Oxidative Stability of the Polymer Electrolyte Composition

FIG. 23 compares the oxidative stability of electrolyte of a composition of the present disclosure based on a mixture charge-transfer complex (PPS-TFBQ-551-TT, black line) and without charge-transfer complex (PPS-551-TT, dotted grey line). Both electrolytes also contain a 5:5:1 molar ratio of lithium salts (LiTFSI:LiFSI:LiBOB) and thietane-1,1-dioxide (TT) as an additive. In these experiments, the potential of the working electrode (aluminum foil) was held constant for 2 h at 25° C. while the parasitic current density was monitored. The potential was then raised 0.1 V and held constant for another 2 h, repeatedly. When the parasitic current density surpassed 1 μA/cm$^2$, the oxidative stability was considered to have been reached. In the case of virgin poly(phenylene sulfide), the oxidative stability appeared to be limited to 4.4 V vs Li/Li$^+$, while that of the charge-transfer complex containing polymer electrolyte based on PPS-TFBQ reached 5.4 V vs Li/Li$^+$.

Figure 24:
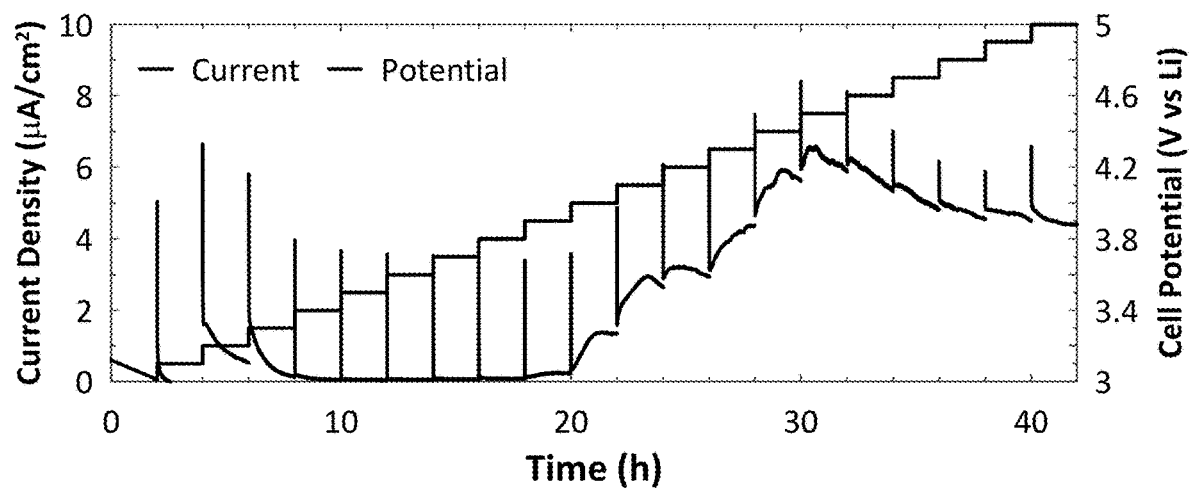
FIG. 24 shows the oxidative stability of a polymer electrolyte composition made with PPS-TCNE charge-transfer complex.
Figure 25:
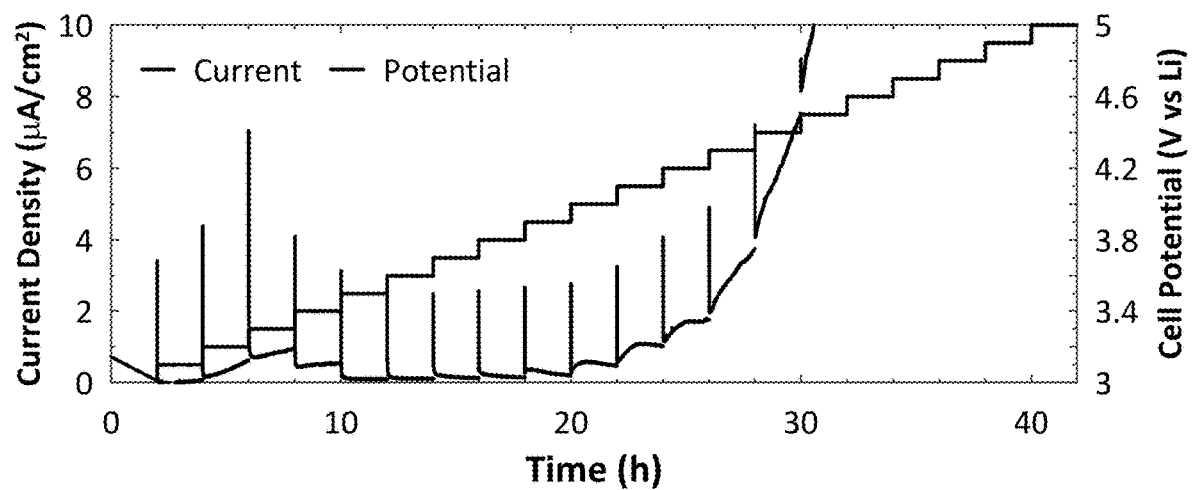
FIG. 25 shows the oxidative stability of a polymer electrolyte composition made with PPS-TCNQ charge-transfer complex.

FIGS. 24 and 25 show the oxidative stability of similar compositions wherein the polymer charge-transfer complex was PPS-TCNE and PPS-TCNQ respectively.

Example 8

Transference Measurement

Figure 29:
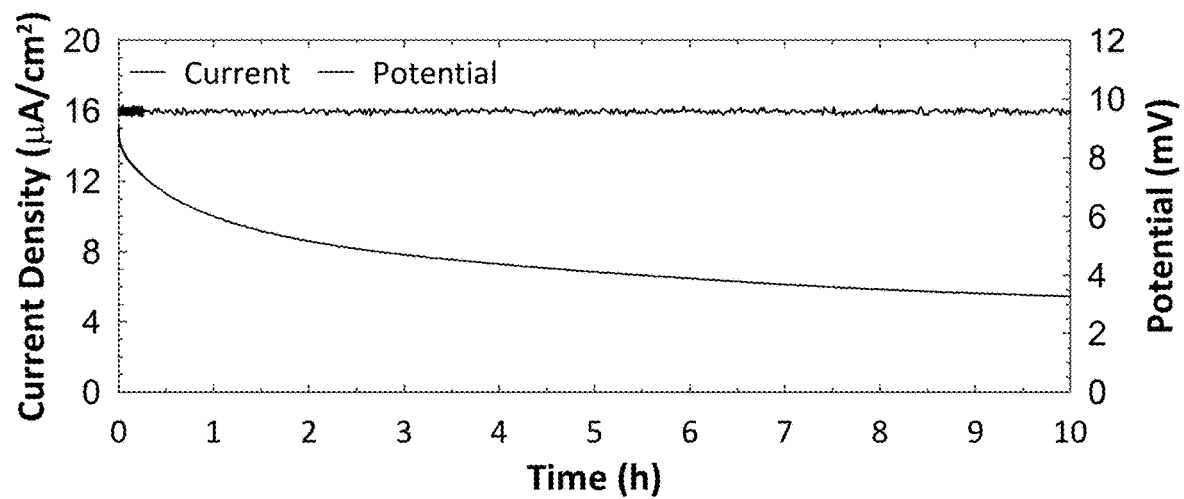
FIG. 29 shows the current density decay during a 10 mV potential hold across a Li/polymer electrolyte/Li cell over 10 h at 25° C. of a polymer electrolyte composition according to one embodiment.
Figure 30:
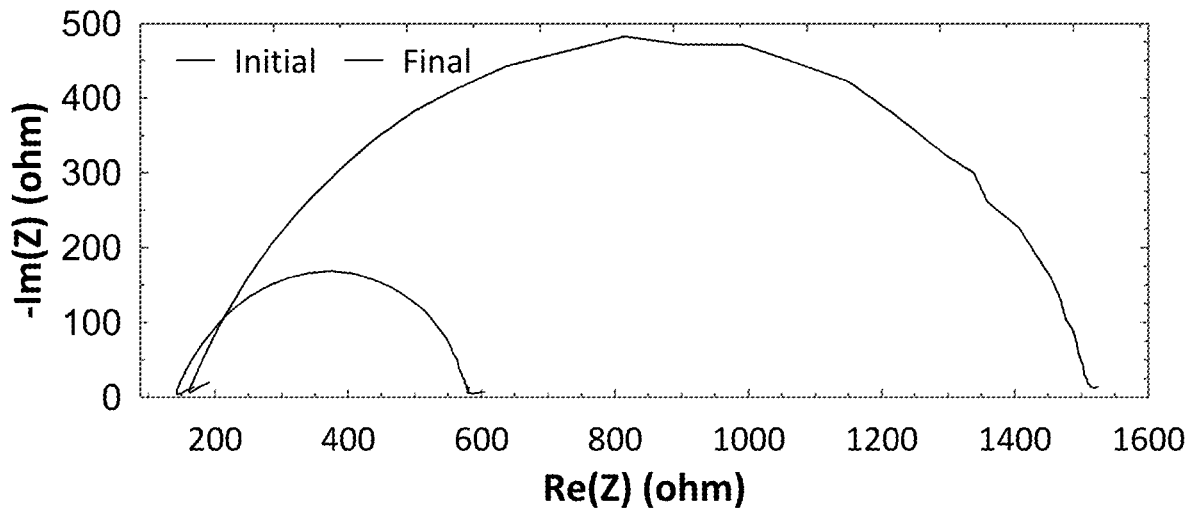
FIG. 30 shows the Nyquist impedance of a Li/polymer electrolyte/Li cell before and after a 10 h potential hold experiment shown in FIG. 29.

Transference measurements were conducted to determine how much of the ionic current measured was being carried by Li$^+$ ions. The transference number of a polymer comprised of a PPS-TFBQ charge-transfer complex, a 5:5:1 molar ratio of lithium salts (LiTFSI:LiFSI:LiBOB) and thietane-1,1-dioxide (TT) as an additive. To perform the measurement, a Li/polymer electrolyte/Li cell was subjected to a potential difference of 10 mV for 10 h at 25° C. FIG. 29 shows the current density decay over that time. FIG. 30 shows the cell impedance both before (solid black line) and after (dotted grey line) the 10 h potential-hold experiment where the diameter of the semi-circle represents the charge-transfer resistance. The initial resistance ($R_O$) and current density ($I_O$) was then compared to the final resistance ($R_{SS}$) and current density ($I_{SS}$) to determine the transference number using the equation:

$$t_{Li^+} = \frac{I_{steady\ state}(\Delta V - I_o R_o)}{I_o(\Delta V - I_{ss}R_{ss})}$$

In this case, the transference number was determined to be 0.52; this is notably better than carbonate-based liquid electrolytes, which typically exhibit $Li^+$ transference numbers of about 0.3 to 0.4. A $Li^+$ transference number of 0.52 indicates that the $Li^+$ conductivity through the polymer electrolyte composition separator layer of 0.22 mS/cm at 25° C., which is similar to the 0.24 mS/cm supported by a commercial polyethylene separator soaked with a conventional liquid electrolyte (i.e. 1 M $LiPF_6$ in 1:1 (by weight) ethylene carbonate:ethyl methyl carbonate). [R. Zahn, M. F. Lagadec, M. Hess and V. Wood, ACS Appl. Mater. Interfaces, 2016, 8, 32637-32642]

Example: Preparation of an NMC Electrode

An NMC electrode was fabricated by adding NMC active material, carbon black conductive additive, PTFE binder and polymer electrolyte powder to a mixing jar. The weight percent of NMC ranged from 40% to 98%, carbon black from 0.2% to 10%, PTFE binder from 0.2% to 10% and polymer electrolyte from 5% to 50%. The mixture was subjected to high-shear mixing using a shear mixer. The resulting dough-like mixture was then calendar-rolled to the desired thickness onto a current collector, such as aluminum foil.

The polymer electrolyte is stable to about 5.2 V, which allows NMC electrodes to be charged up to about 5 V vs $Li/Li^+$, which unlocks higher capacity positive electrodes, thereby increasing the energy density of the cell beyond conventional Li-ion technology.

Example: Preparation of a Sulfur Electrode

A mixture of 40% to 98% by weight sulfur, from 0.2% to 10% carbon black, from 0.2% to 10% PTFE binder and from 5% to 50% polymer electrolyte was prepared. The mixture was then subjected to high-shear mixing using a shear mixer. The resulting dough-like mixture was then calendar-rolled to the desired thickness onto a current collector.

Example: Preparation of a Graphite Electrode

A mixture of from 40% to 98% by weight graphite, from 0.2% to 10% carbon black, from 0.2% to 10% PVDF binder and from 5% to 50% polymer electrolyte was prepared and slurried in N-Methyl-2-pyrrolidone (NMP). The slurry was then subjected to high-shear mixing using a shear mixer and then spread onto a current collector using a doctor blade. The deposited layer was hot-calendar-rolled to the desired thickness.

Example 9: Preparation of Silicon/Graphite Electrode

A mixture of from 0.5% to 98% by weight silicon, from 0.5% to 98% by weight graphite, from 0.2% to 10% carbon black, from 0.2% to 10% PVDF binder and from 5% to 50% polymer electrolyte was prepared and slurried in N-Methyl-2-pyrrolidone (NMP). The slurry was then subjected to high-shear mixing using a shear mixer and then spread onto a current collector using a doctor blade. The deposited layer was hot-calendar-rolled to the desired thickness.

The invention claimed is:

1. A composition, consisting of:
   a redox charge-transfer complex of an electron donor polymer and an electron acceptor compound where the anionic form of the electron acceptor compound has a reduction potential higher than a reduction potential of the electron donor polymer;
   at least one salt selected from the group consisting of alkali metal salts, alkaline earth metal salts, zinc salts and aluminum salts;
   a mixture of high dielectric materials including thietane-1,1-dioxide or an alkyl-substituted thietane-1,1-dioxide and at least one of a cyclic sulfone, a cyclic sultone and a sulfamide; and
   optionally, a polymer different from the electron donor polymer, selected from the group consisting of polyalkyl(meth)acrylates, crosslinked-polyalkyl(meth)acrylates, poly(vinylsulfones) and polyacrylonitriles:
   wherein
   an ionic conductivity of the composition at 25° C. is 0.30 mS/cm or greater,
   the composition is stable to oxidation at 4.2 V vs $Li/Li^+$, and
   the composition has less than 5% crystallinity, as determined by XRD analysis.

2. The composition of claim 1, wherein the electron donor polymer comprises aromatic rings bridged with groups having electron donating heteroatoms selected from the group consisting of —O—, —S—, —Se—, —N(R)— and —P(R)—; wherein R is H, methyl or phenyl.

3. The composition of claim 2, wherein the aromatic rings comprise at least one selected from the group consisting of 1,4-phenylene rings, 2,6-naphthalenyl rings, 4,4'-biphenyl rings and halogenated derivatives of any thereof.

4. The composition of claim 1, wherein the electron donor polymer is at least one selected from the group consisting of poly(phenylene oxide), poly(2,6-dimethyl-1,4-phenylene oxide), poly(phenylene sulfide), poly[thio(2,3,5,6-tetrafluoro-1,4-phenylene)], fluorinated poly(phenylene sulfide) and poly(phenylene imine).

5. The composition of claim 1, wherein the electron acceptor compound comprises a benzoquinone structure, a benzenecarbonitrile structure, an aromatic dianhydride structure, a fullerene structure or a metallo-porphine structure.

6. The composition of claim 1, wherein the electron acceptor compound is at least one selected from the group consisting of tetracyanoethylene, 7,7,8,8-tetracyanoquinodimethane, tetrafluoro-1,4-benzoquinone, tetrachloro-1,4-benzoquinone and tetrabromo-1,4-benzoquinone.

7. The composition of claim 1, wherein the at least one of a cyclic sulfone, a cyclic sultone and a sulfamide is selected from the group consisting of N,N,N',N'-tetramethylsulfamide; tetrahydro-2,6-dimethyl-2H-1,2,6-thiadiazine-1,1-dioxide; 2,5-dimethyl-1,2,5-thiadiazolidine-1,1-dioxide; N,N'-diethyl-N,N'-dimethylsulfamide; N,N,N',N'-tetraethylsulfamide; sulfolane; tetrahydro2-methyl-3-isothiazolidinone-1,1-dioxide; -2-methyl-3-isothiazolidinone-1,1-dioxide, and propane sultone.

8. The composition of claim 1, wherein
a wt % of the redox charge transfer complex is from 25% to 80%,
a wt % of the at least one salt is from 5% to 30%, and
a content of the mixture of high dielectric materials is from 10% to 70 wt %.

9. The composition of claim 1, comprising the polymer different from the electron donor polymer of the charge transfer complex.

10. The composition of claim 1, wherein the composition is electrically insulating having an electrical conductivity of 3.0 nS/cm or less.

11. The composition of claim 1, wherein the ionic conductivity is not changed upon exposure to dry-room air for 16 hours.

12. The composition of claim 1 which is a free flowing powder.

13. A solid state lithium ion battery, comprising:
an anode capable of insertion and extraction of $Li^+$ ions;
a cathode capable of insertion and extraction of $Li^+$ ions; and
a solid state electrolyte between the anode and cathode, comprising the composition of claim 1;
wherein the at least one salt is a lithium salt.

14. The solid state lithium ion battery of claim 13 wherein the anode comprises an active material selected from the group consisting of lithium, a lithium alloy, graphite, hard carbon, lithium titanate (LTO), a tin/cobalt alloy and a silicon/carbon composite.

15. The solid state lithium ion battery of claim 13 wherein the cathode comprises an active material selected from the group consisting of lithium cobalt oxide ($LiCoO_2$), lithium manganese oxide ($LiMn_2O_4$), lithium iron phosphate ($LiFePO_4$), lithium nickel manganese cobalt oxide (NMC), elemental sulfur and a metal sulfide composite.

16. An electrode for a lithium ion battery, comprising:
an active material capable of insertion and extraction of $Li^+$ ions;
a carbon conductive additive;
the composition of claim 1 wherein the at least one salt is a lithium salt; and
a binder.

17. The electrode for a lithium ion battery of claim 16, wherein
the electrode is a positive electrode, and
the active material is at least one selected from the group consisting of lithium cobalt oxide ($LiCoO_2$), lithium manganese oxide ($LiMn_2O_4$), lithium iron phosphate ($LiFePO_4$), lithium nickel manganese cobalt oxide, elemental sulfur and a metal sulfide composite.

18. The electrode for a lithium ion battery of claim 16, wherein
a wt % of the active material is from 40 wt % to 98 wt %, and
a wt % of the composition is from 5 wt % to 50 wt %.

19. The electrode for a lithium ion battery of claim 16, wherein
the electrode is a negative electrode, and
the active material is at least one selected from the group consisting of lithium, a lithium alloy, graphite, hard carbon, lithium titanate (LTO), a tin/cobalt alloy and a silicon/carbon composite.

20. The electrode for a lithium ion battery of claim 19, wherein
a wt % of the active material is from 40 wt % to 98 wta,
a wt % of the composition is from 5 wt % to 50 wt %.

* * * * *